US010923239B2

(12) United States Patent
Singh et al.

(10) Patent No.: US 10,923,239 B2
(45) Date of Patent: Feb. 16, 2021

(54) MOVING AN ENTIRE NUCLEAR REACTOR CORE AS A UNITARY STRUCTURE

(71) Applicant: SMR INVENTEC, LLC, Camden, NJ (US)

(72) Inventors: Krishna P. Singh, Hobe Sound, FL (US); P. Stefan Anton, Southampton, NJ (US); Peter Stefanovic, Langhorne, PA (US)

(73) Assignee: SMR INVENTEC, LLC, Camden, NJ (US)

( * ) Notice: Subject to any disclaimer, the term of this patent is extended or adjusted under 35 U.S.C. 154(b) by 409 days.

(21) Appl. No.: 15/822,704

(22) Filed: Nov. 27, 2017

(65) Prior Publication Data

US 2018/0144835 A1 May 24, 2018

Related U.S. Application Data

(63) Continuation of application No. 14/413,807, filed as application No. PCT/US2013/004972 on Jul. 9, 2013, now Pat. No. 9,865,363.

(Continued)

(51) Int. Cl.
*G21C 5/06* (2006.01)
*G21C 3/30* (2006.01)
(Continued)

(52) U.S. Cl.
CPC .............. *G21C 5/06* (2013.01); *G21C 3/30* (2013.01); *G21C 5/14* (2013.01); *G21C 11/06* (2013.01);
(Continued)

(58) Field of Classification Search
CPC ... G21C 3/30; G21C 3/32; G21C 5/06; G21C 5/14; G21C 1/06; G21C 11/06;
(Continued)

(56) References Cited

U.S. PATENT DOCUMENTS 2,873,242 A * 2/1959 Treshow ............... G21C 19/10
376/264
3,149,043 A * 9/1964 Goldstein ............. G21C 3/30
376/262

(Continued)

FOREIGN PATENT DOCUMENTS

GB 1414286 * 11/1975

OTHER PUBLICATIONS

Kusunoki, "Design of advanced integral-type marine reactor, MRX", Nuclear engineering and design 201, No. 2-3 (2000): 155-175. (Year: 2000).*

(Continued)

*Primary Examiner* — Jack W Keith
*Assistant Examiner* — Daniel Wasil
(74) *Attorney, Agent, or Firm* — The Belles Group, P.C.

(57) ABSTRACT

An entire nuclear fuel core comprising a plurality of fuel assemblies is preassembled in a nuclear fuel cartridge having a self-supporting unitary support structure. During a refueling operation, the unitary support structure is moved into a nuclear reactor vessel. The unitary support structure may be formed by top and bottom core plates coupled together by vertically-oriented connecting rods which compress the fuel assemblies therebetween. A plurality of reflector wall segments circumscribe the core and are the coupled together between the core plates by the connecting rods which are coupled to the core plates. The connecting rods may extend through the wall segments.

13 Claims, 31 Drawing Sheets

Related U.S. Application Data

(60) Provisional application No. 61/669,428, filed on Jul. 9, 2012.

(51) Int. Cl.
| | | |
|---|---|---|
| *G21C 5/14* | (2006.01) | |
| *G21C 11/06* | (2006.01) | |
| *G21C 19/19* | (2006.01) | |
| *G21C 1/06* | (2006.01) | |
| *G21C 3/32* | (2006.01) | |
| *G21C 19/07* | (2006.01) | |
| *G21C 19/18* | (2006.01) | |
| *G21C 3/33* | (2006.01) | |

(52) U.S. Cl.
CPC .............. *G21C 19/19* (2013.01); *G21C 1/06* (2013.01); *G21C 3/32* (2013.01); *G21C 3/3315* (2013.01); *G21C 19/07* (2013.01); *G21C 19/18* (2013.01); *Y02E 30/30* (2013.01); *Y10T 29/49947* (2015.01)

(58) Field of Classification Search
CPC ........ G21C 19/07; G21C 19/18; G21C 19/32; G21C 19/19; G21F 5/008; G21F 5/012; G21F 5/12; G21F 5/14
USPC .......................................... 376/262, 264, 918
See application file for complete search history.

(56) References Cited

U.S. PATENT DOCUMENTS

| | | | | |
|---|---|---|---|---|
| 3,640,844 | A | | 2/1972 | Shank et al. |
| 3,855,061 | A | * | 12/1974 | Triggiani ................. G21C 3/16 376/411 |
| 3,923,596 | A | * | 12/1975 | Leonard ................... G21C 3/36 376/432 |
| 3,952,885 | A | * | 4/1976 | Schabert ................ G21C 19/32 376/270 |
| 4,695,425 | A | | 9/1987 | Aoyama et al. |
| 4,702,881 | A | | 10/1987 | Weiland et al. |
| 4,731,220 | A | | 3/1988 | Kim, Jr. |
| 4,849,162 | A | | 7/1989 | Garner et al. |
| 4,941,159 | A | | 7/1990 | Schwirian et al. |
| 5,075,075 | A | | 12/1991 | Kapil |
| 5,176,877 | A | | 1/1993 | Nakajima et al. |
| 5,319,692 | A | * | 6/1994 | Hopkins ................ G21C 11/06 376/458 |
| 5,359,634 | A | | 10/1994 | Johannesson |
| 5,706,319 | A | * | 1/1998 | Holtz ..................... G21C 13/06 376/263 |
| 7,139,352 | B2 | * | 11/2006 | Nishiguchi .............. G21C 3/02 376/327 |
| 7,873,138 | B2 | * | 1/2011 | Nakajima .............. G21C 11/06 376/458 |
| 2003/0123600 | A1 | | 7/2003 | Hesketh et al. |

OTHER PUBLICATIONS

Uchiyama, "World's first all-in-one-piece extraction and replacement work of PWR reactor internals", Mitsubishi Heavy Industries, Ltd. Technical Review 43, No. 1 (2006). (Year: 2006).*

International Search Report and the Written Opinion issued in International Application PCT/US2013/049722 dated Feb. 20, 2014. WO.

Stanculescu, A., ed. Thorium fuel utilization: options and trends. 2002. IAEA-TECDOC-1319.

* cited by examiner

MOVING AN ENTIRE NUCLEAR REACTOR CORE AS A UNITARY STRUCTURE

CROSS-REFERENCE TO RELATED PATENT APPLICATIONS

The present application is a continuation of U.S. patent application Ser. No. 14/413,807 filed Jan. 9, 2015, which is a U.S. national stage application under 35 U.S.C. § 371 of PCT Application No. PCT/US2013/049722 filed Jul. 9, 2013, which claims the benefit of U.S. Provisional Patent Application No. 61/669,428 filed Jul. 9, 2012; the entireties of which are incorporated herein by reference.

FIELD OF THE INVENTION

The present invention elates generally to nuclear reactors and methods and apparatus of fueling and defueling the same, and more specifically to an optimized arrangement of fuel assemblies in a nuclear reactor core and/or a portable nuclear fuel cartridge.

BACKGROUND OF THE INVENTION

A typical nuclear reactor core in a light water reactor comprises tightly packed "nuclear fuel assemblies" (also referred to as nuclear fuel bundles) of square cross section. Each nuclear fuel assembly is an assemblage of multiple "nuclear fuel rods" which are sealed hollow cylindrical metal tubes (e.g. stainless steel or zirconium alloy) packed with enriched uranium fuel pellets and integral burnable poisons arranged in an engineered pattern to facilitate as uniform a burning profile of the nuclear fuel assembly (in both the axial and cross sectional/transverse directions) as possible. Heretofore, in prior systems, each of the nuclear fuel assemblies are handled individually and loaded/unloaded from the stationary nuclear reactor located inside the reactor vessel one at a time, which has proved to be a cumbersome and time consuming process. Periodically, spent nuclear fuel assemblies are removed and unloaded on a piecemeal basis from the nuclear reactor core, which are then placed in a spent fuel pool for temporary storage. These spent nuclear fuel assemblies are later moved from the spent fuel pool to a fuel storage facility using transport canisters (such as multi-purpose canisters) and/or casks. New nuclear fuel assemblies are then inserted and loaded on a piecemeal basis into the nuclear reactor core. As can be imagined, this process requires lengthy unit refueling outages to complete all of the necessary nuclear fuel assembly replacements.

The leakage of neutrons from the periphery of the fuel core is minimized by a so-called "reflector," which, as its name implies, serves to reflect the outgoing neutrons back towards the core. The reflector girdles the core, minimizing its physical space with the peripheral fuel assemblies. The square shaped fuel assemblies however, are not conducive to making efficient use of all available space within the core circumscribed by the reflector leaving unused regions between the core and reflector.

In view of the above, an improved reactor core is desirable. Additionally, improved apparatus and methods for fueling and/or defueling nuclear reactors are also desirable.

SUMMARY OF THE INVENTION

In one aspect, an improved nuclear reactor core is provided that utilizes nuclear fuel assemblies having two different transverse cross-sectional configurations. The nuclear fuel assemblies having two different transverse cross-sectional configurations are arranged in a pattern that, compared to existing nuclear reactor cores, takes advantage of peripheral corner regions that are formed between the fuel core and the reflector cylinder (which is generally a tubular structure that circumferentially surrounds the nuclear fuel core). In nuclear reactor cores that utilize nuclear fuel assemblies having only one cross-sectional configuration, such peripheral corner regions are left empty as they are too small to accommodate one of the nuclear fuel assemblies. By creating the nuclear reactor with nuclear fuel assemblies having at least two different transverse cross-sectional configurations, nuclear fuel assemblies can be provided in these peripheral corner spaces that were previously left empty, thereby providing a nuclear reactor core that makes optimum use of the available nuclear reactor core space to increase the service or cycle life of the nuclear fuel supply.

In one embodiment, the improved nuclear reactor core utilizes available nuclear reactor core space by providing a plurality of second fuel assemblies in the heretofore empty peripheral corner regions created by a plurality of first fuel assembles, wherein the first and second nuclear fuel assemblies have different configurations. Because the second nuclear fuel assemblies will typically have a smaller transverse cross-section than the first nuclear fuel assemblies in certain embodiments (and thus include less fuel rods), the first nuclear fuel assemblies may be referred to as "full nuclear fuel assemblies" while the second nuclear fuel assemblies may be referred to as "partial nuclear fuel assemblies" for convenience. In certain embodiments, these partial nuclear fuel assemblies may not have control rods, although in other embodiments these partial nuclear fuel assemblies may include control rods. In one exemplary embodiment, with the partial nuclear fuel assemblies installed, the resulting nuclear fuel core (which may be referred to as a fuel assembly array if desired) may approximate an octagon in transverse cross-section. Accordingly, in some embodiments, the full nuclear fuel assemblies may have a rectangular transverse cross-sectional shape while the partial nuclear fuel assemblies may have a generally triangular transverse cross-sectional shape.

Calculations show that by adding the partial fuel assemblies, the cycle life of the nuclear fuel core may be increased by approximately four months in some embodiments. An even greater increase in the cycle life, as much as an additional four months, may be realized by coasting at a reduced operating power level, say approximately 90% of normal power, in the last few months of the cycle. This stretch power approach directly helps in nuclear fuel utilization (through higher burn-up). Accordingly, the partial fuel assemblies advantageously support such convenient power stretching strategies.

In one such embodiment, the invention can be a nuclear reactor core comprising: a reflector cylinder; a nuclear fuel core disposed within the reflector cylinder, the fuel assembly array comprising: a plurality of first nuclear fuel assemblies, each of the plurality of first nuclear fuel assemblies having a first transverse cross-sectional shape; and a plurality of second nuclear fuel assemblies, each of the plurality of second nuclear fuel assemblies having a second transverse cross-sectional shape that is different than the first transverse cross-sectional shape.

In another such embodiment, the invention can be a nuclear reactor core comprising: a plurality of first nuclear fuel assemblies, each of the plurality of first nuclear fuel assemblies having a first transverse cross-sectional configuration, the plurality of first nuclear fuel assemblies arranged in a rectilinear pattern defining peripheral corner regions; a plurality of second nuclear fuel assemblies, each of the plurality of second nuclear fuel assemblies having a second transverse cross-sectional configuration that is different than the first transverse cross-sectional configuration; and wherein the plurality of second nuclear fuel assemblies are disposed within the corner regions, the plurality of first and second nuclear fuel assemblies collectively forming a nuclear fuel core.

In a further such embodiment, the invention can be a nuclear fuel core comprising: a plurality of first nuclear fuel assemblies, each of the plurality of first nuclear fuel assemblies having a first transverse cross-sectional configuration; and a plurality of second nuclear fuel assemblies, each of the plurality of second nuclear fuel assemblies having a second transverse cross-sectional configuration that is different than the first transverse cross-sectional configuration.

In another aspect, a portable nuclear fuel cartridge is provided that allows a nuclear reactor to be completely fueled and/or defueled by loading and/or unloading a self-supporting assemblage as a single unit. The portable nuclear fuel cartridge includes a unitary support structure and an integrated nuclear fuel core that is configured to be insertable into and removable from a nuclear reactor vessel as a self-contained and self-supporting unit, thereby forming a complete and highly portable nuclear fuel core. Accordingly, embodiments of the present invention include a portable nuclear fuel cartridge which is self-supporting and free standing outside of the nuclear reactor vessel with all of the nuclear fuel assemblies completely pre-installed. The integrated nuclear fuel core may comprise all of the nuclear fuel assemblies required to operate the nuclear reactor.

Without limitation, the portable nuclear fuel cartridge may comprise a unitary support structure, such as an open skeletal framework, that supports the nuclear fuel core therein. The unitary support structure may be comprised of top and bottom support structures, such as top and bottom core plates, that are coupled together by connecting members, such as rods. The nuclear fuel core is retained in the unitary support structure and sandwiched between the top and bottom support structure. In one embodiment, a reflector such as a reflector cylinder may be included as part of the portable nuclear fuel cartridge. In other embodiments, the reflector may be omitted as the reflector may be included as part of the nuclear reactor vessel.

The portable nuclear fuel cartridge may be preassembled outside of the nuclear reactor vessel with all nuclear fuel assemblies intact, and then inserted into the nuclear reactor vessel. When the fuel supply is depleted, the entire portable nuclear fuel cartridge may be readily removed from the nuclear reactor vessel and a new complete and preassembled portable nuclear fuel cartridge may be inserted in its place. Advantageously, this negates the need to handle individual nuclear fuel assemblies on-site in piecemeal fashion to significantly reduce nuclear unit downtime for refueling. The portable nuclear fuel cartridge is constructed to be lifted, transported, installed, and stored as self-supporting and free-standing. In essence, the portable nuclear fuel cartridge serves as a "cradle-to-grave" structure from fueling a nuclear reactor to long-term storage.

In one such embodiment, the invention can be a portable nuclear fuel cartridge comprising: a unitary support structure; a plurality of nuclear fuel assemblies arranged to collectively form a fuel core for a nuclear reactor, each of the plurality of nuclear fuel assemblies comprising a plurality of nuclear fuel rods; and the fuel core integrated into the unitary support structure to collectively form a self-supporting assemblage than can be lifted as a single unit.

In another such embodiment, the invention can be a portable nuclear fuel cartridge configured for placement in a reactor vessel, the fuel cartridge comprising: top and bottom core plates at opposing ends of the unitary nuclear fuel cartridge, each of the top and bottom core plates including a gridwork defining a plurality of open cells; a plurality of nuclear fuel assemblies disposed between the top and bottom core plates, each of the plurality of nuclear fuel assemblies including a plurality of fuel rods; a plurality of connecting members extending between and interconnecting the top and bottom core plates together to form a unitary support structure; and the top and bottom core plates, the plurality of connecting members, and the plurality of nuclear fuel assemblies collectively defining an assemblage that is self-supporting outside of the reactor vessel and transportable as a single unit.

In a further such embodiment, the invention can be a method of assembling a nuclear fuel cartridge comprising: a) positioning a plurality of fuel assemblies between top and bottom core plates, each fuel assembly including a plurality of fuel rods and top and bottom flow nozzles at opposing ends thereof; b) coupling the top and bottom core plates together with a plurality of connecting rods extending between the core plates; and c) drawing the top and bottom core plates together with the connecting rods, wherein the fuel assemblies are sandwiched between the top and bottom core plates to form a self-supporting assemblage than can be lifted as a single unit.

In a further aspect, methods of fueling and/or defueling a nuclear reactor are provided that take advantage of a nuclear fuel cartridge that comprises a unitary support structure and a nuclear fuel core integrated into the unitary support structure such that the nuclear fuel cartridge can be handled as a single unit.

In one such embodiment, the invention can be a method of fueling a nuclear reactor, the method comprising: a) opening a nuclear reactor vessel; b) moving a nuclear fuel cartridge from a position outside of the nuclear reactor vessel to a position within an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) closing the nuclear reactor vessel.

In another such embodiment, the invention can be a method of defueling a nuclear reactor, the method comprising: a) opening a nuclear reactor vessel; b) removing a nuclear fuel cartridge from an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) submerging the nuclear fuel cartridge within a spent fuel pool.

In yet another such embodiment, the invention can be a method of storing spent nuclear fuel, the method comprising: a) removing a nuclear fuel cartridge from an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; b) positioning the nuclear fuel cartridge in a multi-purpose canister; and c) positioning the multi-purpose canister in a cask.

It is to be understood that the various aspects of the invention described above can be combined in various manners. Moreover, further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments will be described with reference to the following drawings in which like elements are labeled similarly, and in which.

Figure 1:
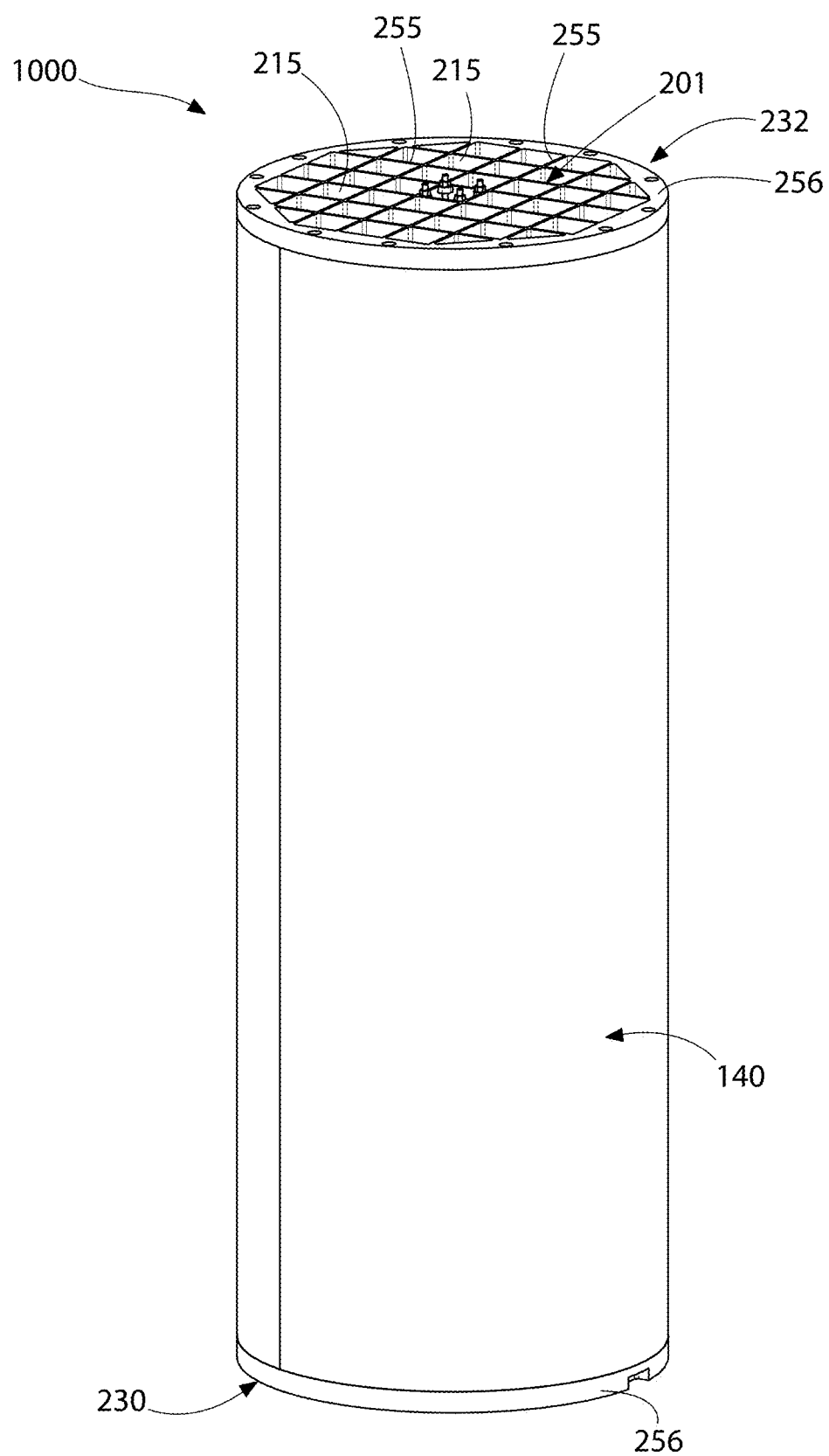
FIG. 1 is a perspective view of a nuclear fuel cartridge according to an embodiment of the present invention.

All drawings are schematic and not necessarily to scale. Parts given a reference numerical designation in one figure may be considered to be the same parts where they appear in other figures without a numerical designation for brevity unless specifically labeled with a different part number and described herein

DETAILED DESCRIPTION

The features and benefits of the present disclosure are illustrated and described herein by reference to exemplary embodiments. This description of exemplary embodiments is intended to be read in connection with the accompanying drawings, which are to be considered part of the entire written description. Accordingly, the present disclosure expressly should not be limited to such embodiments illustrating some possible non-limiting combination of features that may exist alone or in other combinations of features; the scope of the claimed invention being defined by the claims appended hereto.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "affixed," "connected," "interconnected," and the like refer to a relationship wherein structures are secured or attached to one another either directly or indirectly through intervening structures, as well as both movable or rigid attachments or relationships, unless expressly described otherwise.

For ease of discussion, the descriptions of the various aspects of the invention have been broken down into three sections. It is, however, to be understood that in certain embodiments, the aspects of the inventions, or portions thereof, can be combined as desired. For example, the optimized fuel core concepts discussed in the first section below can be included in the portable nuclear fuel cartridge concept discussed in the second section discussed below, and vice versa. In other embodiments, however, the optimized fuel core concepts are not limited to the portable nuclear fuel cartridge environment but can be incorporated into a nuclear reactor core having a stationary support structure for supporting the nuclear fuel assemblies in the optimized fuel core arrangement. Similarly, while the portable nuclear fuel cartridge is exemplified as utilizing the optimized fuel core in certain embodiments, in other embodiments the portable nuclear fuel cartridge can utilize a nuclear fuel core with a more traditional pattern, such as a rectilinear arrangement that utilizes only nuclear fuel assemblies having the same transverse cross-sectional configuration.

Optimized Fuel Core Geometry & Reactor Core Including the Same

Figure 4:
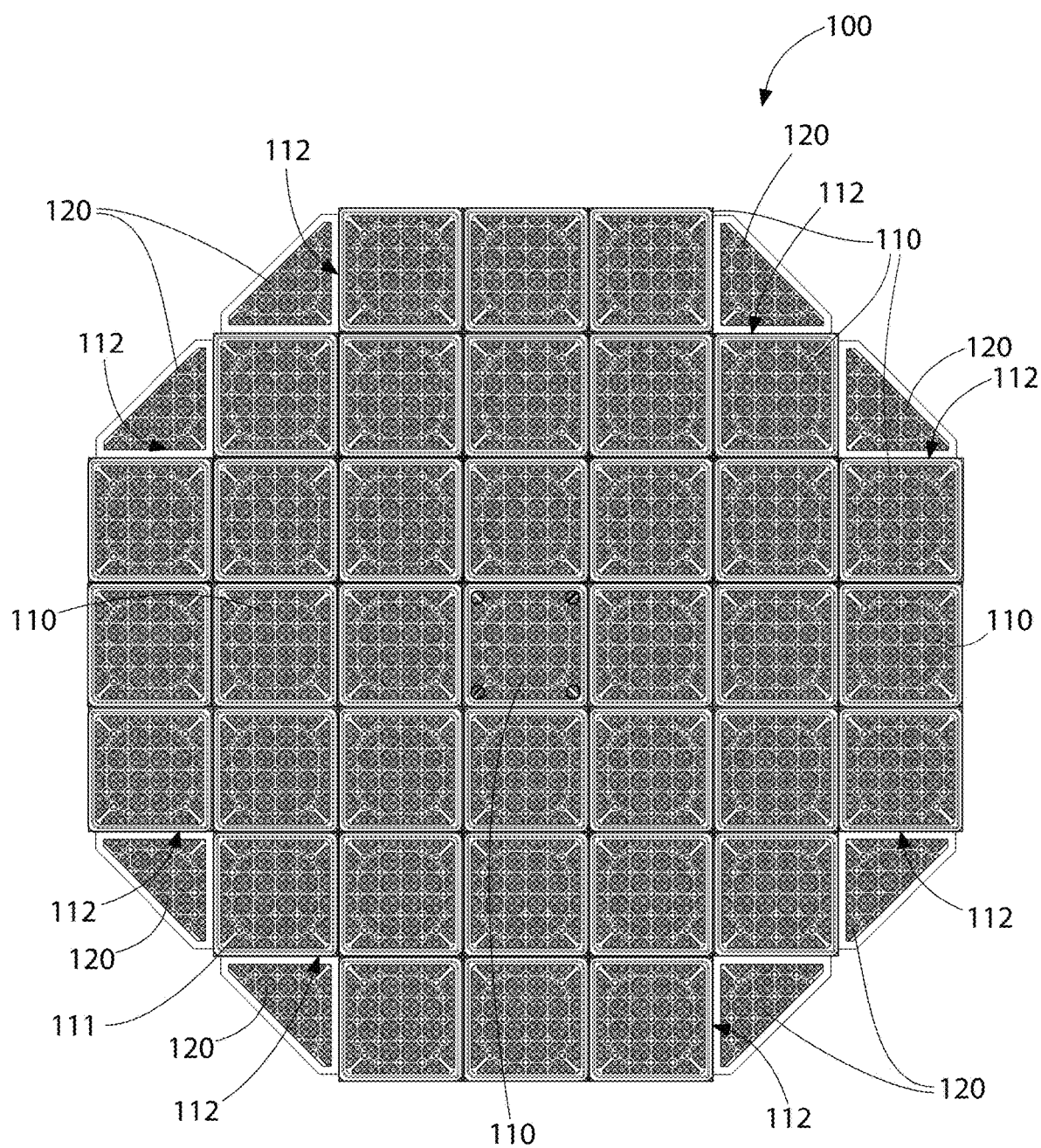
FIG. 4 is transverse cross-sectional view through a nuclear fuel core according to an embodiment of the present invention, which happens to be incorporated into the nuclear fuel cartridge of FIG. 1.

Referring first to FIG. 4, a nuclear fuel core 100 according to an embodiment of the present invention is illustrated. In certain embodiments, the nuclear fuel core 100 can be incorporated into a portable nuclear fuel cartridge 1000

(discussed in greater detail below), which is then positioned within a nuclear reactor vessel 500, thereby forming a nuclear reactor core 550 in conjunction with other reactor core infrastructure and stationary components. In another embodiment, the nuclear fuel core 100 can be formed in the nuclear reactor vessel 500 by loading the nuclear fuel assemblies 110, 120 into a stationary support structure that is designed to create the optimized fuel arrangement discussed below, thereby forming the nuclear reactor core.

The nuclear fuel core 100 comprises a plurality of first nuclear fuel assemblies 110 and a plurality of second nuclear fuel assemblies 120. Each of the plurality of first nuclear fuel assemblies 110 comprises a first transverse cross-sectional configuration. Each of the plurality of second nuclear fuel assemblies 120 comprises a second transverse cross-sectional configuration, wherein the first and second transverse cross-sectional configurations are different from one another. In one embodiment, the first transverse cross-sectional configuration is different than the second transverse cross-sectional configuration due to the first and second transverse cross-sectional configurations being different shapes. In another embodiment, the first transverse cross-sectional configuration is different than the second transverse cross sectional configuration due to the first and second transverse cross-sectional configurations being different sizes. In certain other embodiments, the first transverse cross-sectional configuration is different than the second transverse cross sectional configuration due to the first and second transverse cross-sectional configurations being of different sizes and shapes.

In the exemplified embodiment, the first transverse cross-sectional configuration of the first nuclear fuel assemblies 110 comprises a rectangular transverse cross-sectional shape while the second transverse cross-sectional configuration of the second nuclear fuel assemblies 120 comprises a triangular transverse cross-sectional shape. In one embodiment, the rectangular transverse cross-sectional shape of the first transverse cross-sectional configuration of the first nuclear fuel assemblies 110 is square. The invention, however, is not limited to any specific shape for either of the first and/or second transverse cross-sectional configurations unless specified by the claims. In other embodiments, the first and/or second transverse cross-sectional configurations can take on other polygonal, oval, and/or irregular shapes.

In another embodiment, both the first and second transverse cross-sectional shapes can comprises a rectangular transverse cross-sectional shapes, wherein the rectangular transverse cross-sectional shape of the second transverse cross-sectional configuration has a sufficiently smaller area than that of the rectangular transverse cross-sectional shape of the first transverse cross-sectional configuration such that the second plurality of nuclear fuel assemblies 120 can fit within the peripheral corner regions 101 (as explained in greater detail below).

The plurality of first nuclear fuel assemblies 110 are arranged to form a central region of the nuclear fuel core 100 while the second nuclear fuel assemblies 120 are arranged about the periphery of the central region formed by the first nuclear fuel assemblies 110. In the exemplified embodiment, the plurality of first nuclear fuel assemblies 110 are arranged in a rectilinear pattern to form a central region having a modified cruciform shape defining peripheral corner regions 112. In one embodiment, such as the one illustrated, the modified cruciform pattern formed by the first nuclear fuel assemblies 120 comprises four symmetric quadrants, each of the four quadrants comprising two peripheral corner regions 112. Of course, in other embodiments, the first nuclear fuel assemblies 110 can be arranged in other patterns, rectilinear or non-rectilinear, that also form peripheral corner regions 112.

The plurality of second nuclear fuel assemblies 120 are disposed within the corner regions 112, thereby forming a nuclear fuel core 100 that is densely packed with fuel assemblies 110, 120 that maximizes the available space in the nuclear reactor core (which in some embodiments may be defined as the space circumscribed by the reflector cylinder 140). Moreover, while in the exemplified embodiment, the nuclear fuel core 100 comprises nuclear fuel assemblies 110, 120 having two different transverse cross-sectional configurations, in other embodiments the nuclear fuel core 100 may comprise nuclear fuel assemblies having more than two different transverse cross-sectional configurations, such as three or four to further maximize the available space in the nuclear reactor core.

Due to the arrangement of the second nuclear fuel assemblies 120 in the corner regions 112 formed by the pattern of the first nuclear fuel assemblies 110, the nuclear fuel core 100 has a polygonal transverse cross-sectional shape. In one non-limiting embodiment, when the first and second nuclear fuel assemblies 110, 120 are arranged in the illustrated pattern, the nuclear fuel core 100 has an octagonal transverse cross-sectional shape. Of course, other transverse cross-sectional shapes can be achieved for the nuclear fuel core 100 utilizing the above concepts, the exact shape of which will be dictated by the selected transverse cross-sectional shapes of the first and second nuclear fuel assemblies 110, 120 and their arrangement within the pattern.

In one example, without limitation, the nuclear fuel core 100 may be comprised of thirty-seven full first nuclear fuel assemblies 110 and eight second nuclear fuel assemblies 120. Due in part to its small transverse cross-section compared to large nuclear reactor cores, a compact nuclear fuel core 100 with thirty-seven first nuclear fuel assemblies 110 enriched to 5% U-235 computes to have a cycle life of approximately 42 months (in contrast to only 18 to 24 months for the large reactor cores used in modern operating reactors).

Figure 7:
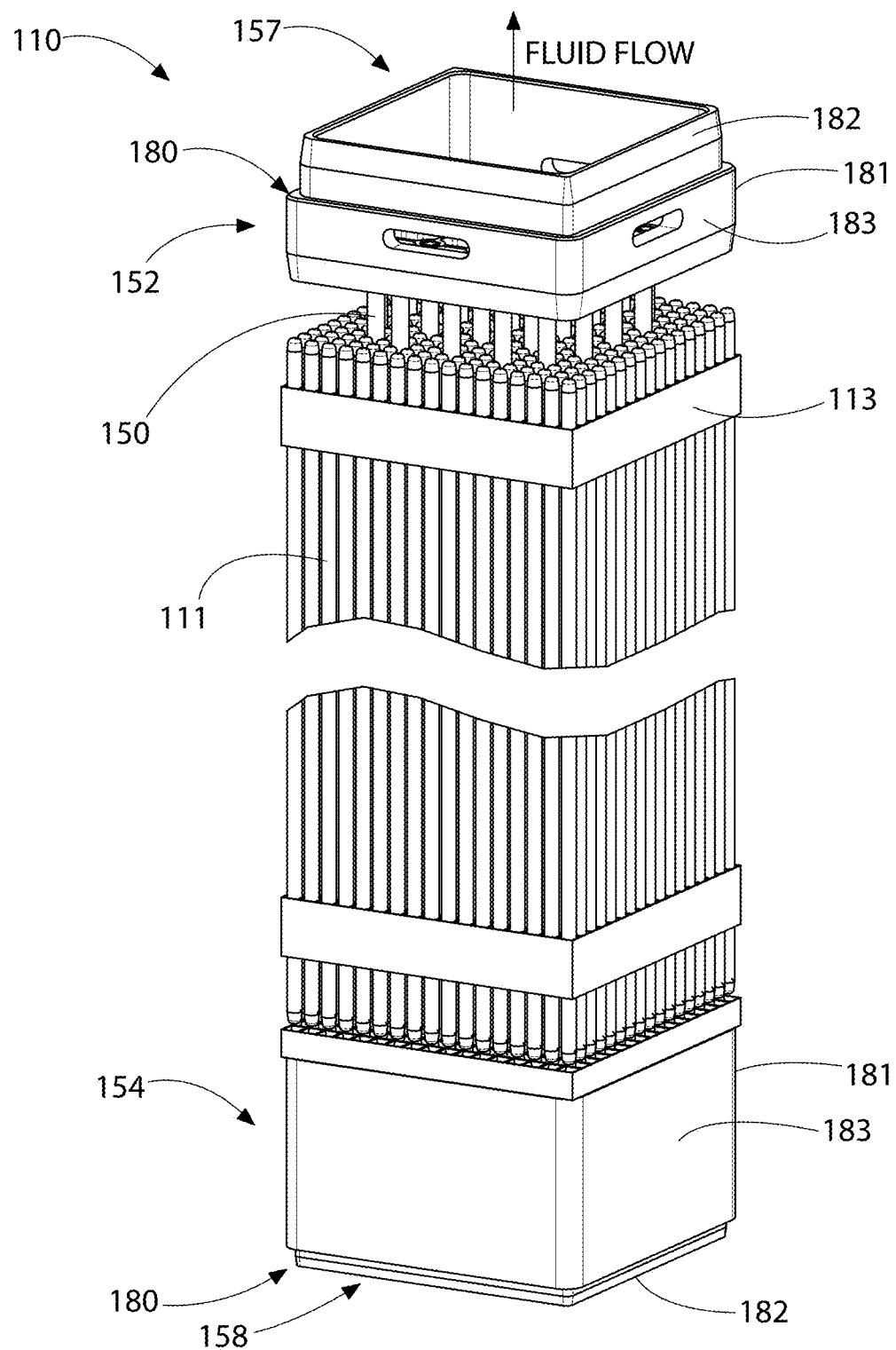
FIG. 7 is a close-up view of the top and bottom portions of the first nuclear fuel assembly of FIG. 5B, wherein the first nuclear fuel assembly is shown broken in length.
Figure 8:
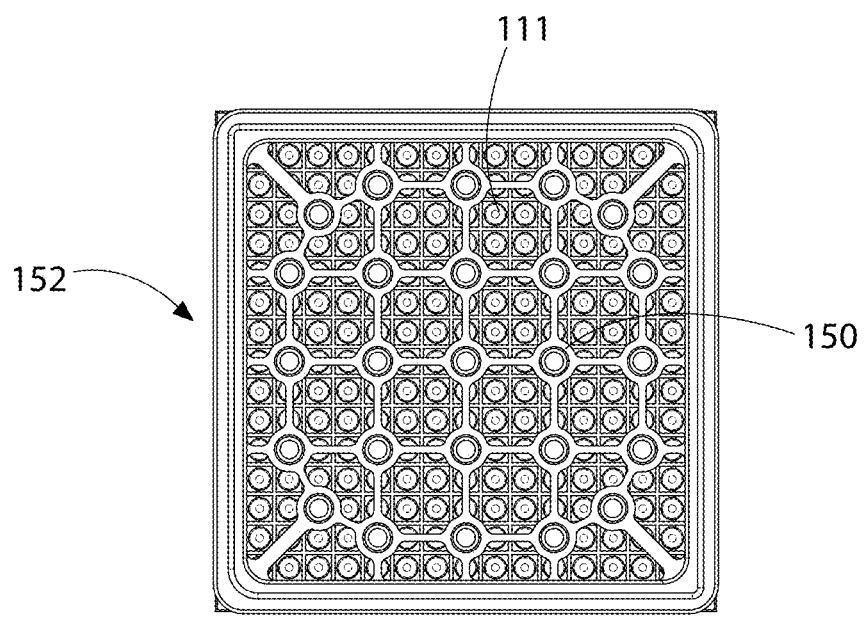
FIG. 8 is a top view of the first nuclear fuel assembly of FIG. 5B.
Figure 9:
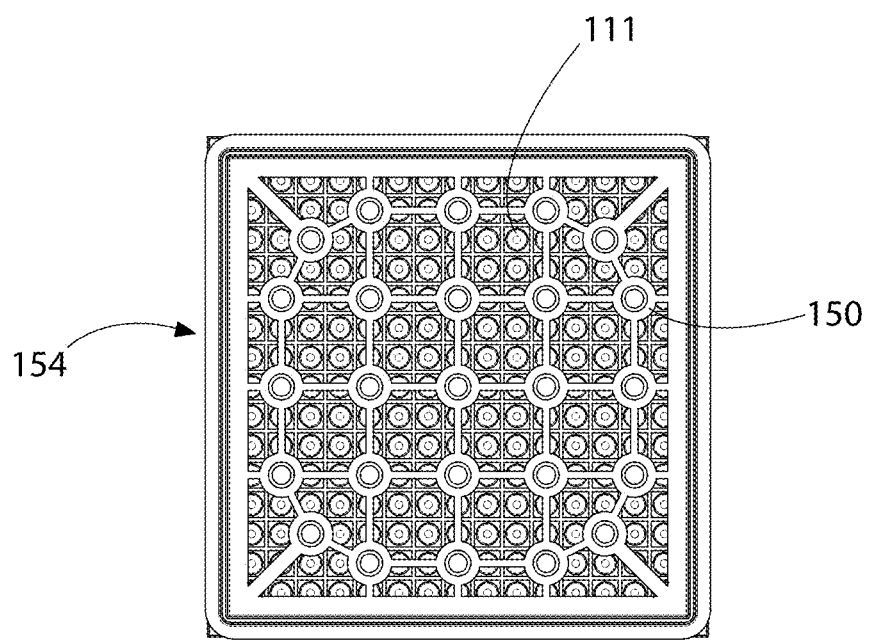
FIG. 9 is bottom view of the first nuclear fuel assembly of FIG. 5B.

In one embodiment, each of the thirty-seven first nuclear fuel assemblies 110 in this nuclear fuel core 100 include their own individual control rod assembly that is operated autonomously to raise and/or lower control rods 150 (best shown in FIG. 7) to control reactivity during the nuclear reactor's operation. Each of the plurality of second nuclear fuel assemblies 120 is free of a control rod assembly in one embodiment. However, in other embodiments, each of the plurality of second nuclear fuel assemblies 120 can include a control rod assembly similar to that described above for the first nuclear fuel assemblies 100.

Each of the first and second nuclear fuel assemblies 110, 120 comprise a plurality of nuclear fuel rods 111. Because the first nuclear fuel assemblies 110 are larger in transverse cross-sectional size than the second nuclear fuel assemblies 120, each of the plurality of first nuclear fuel assemblies 110 comprises X nuclear fuel rods while each of the plurality of second nuclear fuel assemblies 120 comprises Y nuclear fuel rods, wherein Y is less than X. Thus, conceptually, the first nuclear fuel assemblies 110 may be referred to as "full nuclear fuel assemblies" while the second nuclear fuel assemblies 120 may be referred to as "partial nuclear fuel assemblies" for convenience. In one embodiment, a ratio of Y:X is in a range of 1:1.5 to 1:3. In a more specific embodiment, Y is about one-half X.

Figure 16:
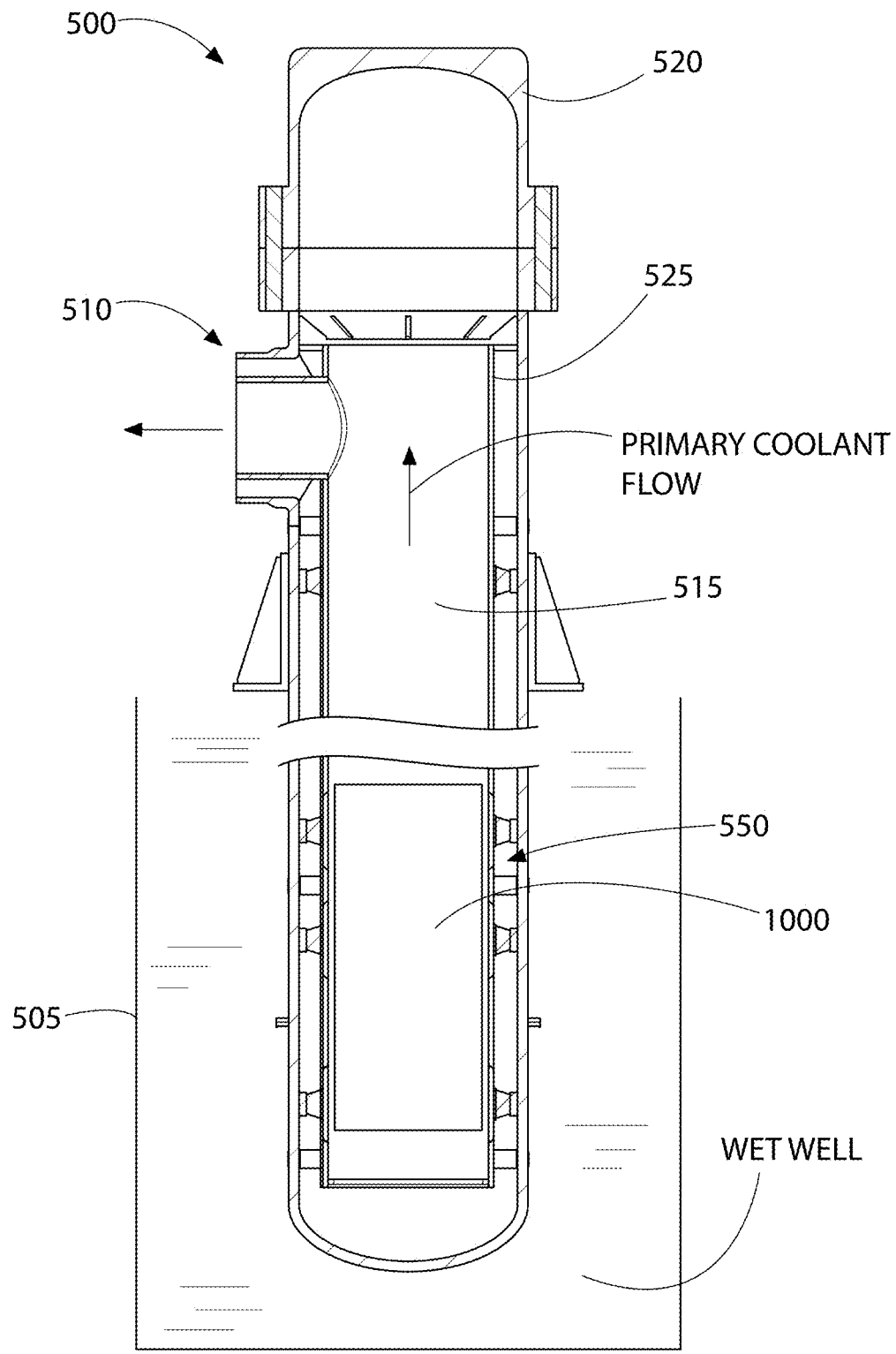
FIG. 16 is a side view of the nuclear fuel cartridge of FIG. 1 positioned within a nuclear reactor vessel, in accordance with an embodiment of the present invention.

Referring now to FIGS. 4 and 16 concurrently, it is mentioned above that when the nuclear fuel core 100 is properly positioned in (or formed within) an interior cavity 515 of the nuclear reactor vessel 500, a nuclear reactor core 550 is conceptually formed. In certain embodiments, in addition to the nuclear fuel core 100, the nuclear reactor core 550 may comprises a reflector cylinder. While in the embodiment illustrated in FIG. 16 the reflector cylinder is integrated as part of the nuclear fuel cartridge 1000 (see element 140 in FIG. 2), in other embodiments, the reflector cylinder may be mounted within the nuclear reactor vessel 500 in a stationary manner.

Irrespective of whether the reflector cylinder is part of a portable nuclear fuel cartridge or permanently mounted within the nuclear reactor vessel 500, the reflector cylinder may be a hollow tubular structure which extends vertically and defines a substantially circular interior compartment (in transverse cross-section) in which the nuclear fuel core 100 is disposed. The reflector cylinder minimizes leakage of neutrons from the periphery of the nuclear fuel core 100 by reflecting the outgoing neutrons back towards the nuclear fuel core 100. The reflector cylinder circumferentially surrounds the nuclear fuel core 100. In one embodiment, the reflector cylinder may be comprised of individual arcuately-shaped reflector wall segments, as described in greater detail below for the portable nuclear fuel cartridge 1000. In other embodiments, the reflector cylinder is singular hollow tube structure.

In certain embodiments, the reflector cylinder has a circular transverse cross-sectional shape while the first nuclear fuel assemblies 110 have a rectangular transverse cross-sectional shape and are arranged in a rectilinear pattern. As a result, a spaces exists between the periphery of the pattern of first nuclear fuel assemblies 110 and the inner surface of the reflector cylinder that is too small (or of a shape) such that one of the first nuclear fuel assembly cannot be accommodated. However, due to having a different transverse configuration than that of the first nuclear fuel assemblies 110, the second nuclear fuel assemblies 110 can be accommodated within the spaces formed between the periphery of the pattern of first nuclear fuel assemblies 110 and the inner surface of the reflector cylinder. In one embodiment, the shape and size of the transverse cross-sectional shape of the second nuclear fuel assemblies 120 is selected so that the spaces between the periphery of the pattern of first nuclear fuel assemblies 110 and the inner surface of the reflector cylinder are substantially filled and completely occupied. As a result, the nuclear fuel core 100 allows additional nuclear fuel rods 111 to be packed into the nuclear fuel core 100 while not taking up additional space within the nuclear reactor vessel 500.

Additional structural details of certain embodiments of the first and second fuel assemblies 110, 120 will be described below with respect to the portable nuclear fuel cartridge 1000.

Portable Nuclear Fuel Cartridge

Figure 2:
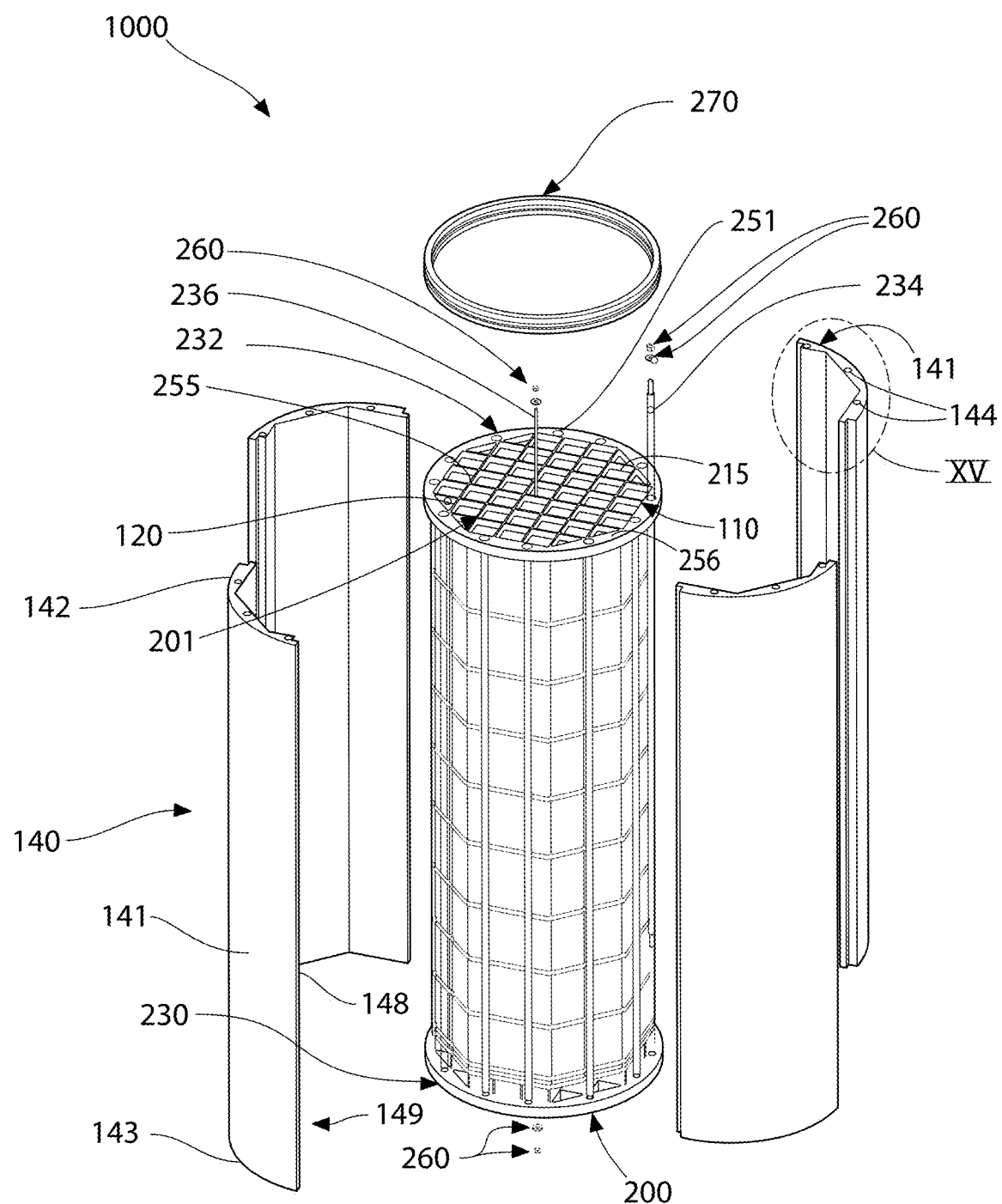
FIG. 2 is an exploded view of the nuclear fuel cartridge of FIG. 1.
Figure 3:
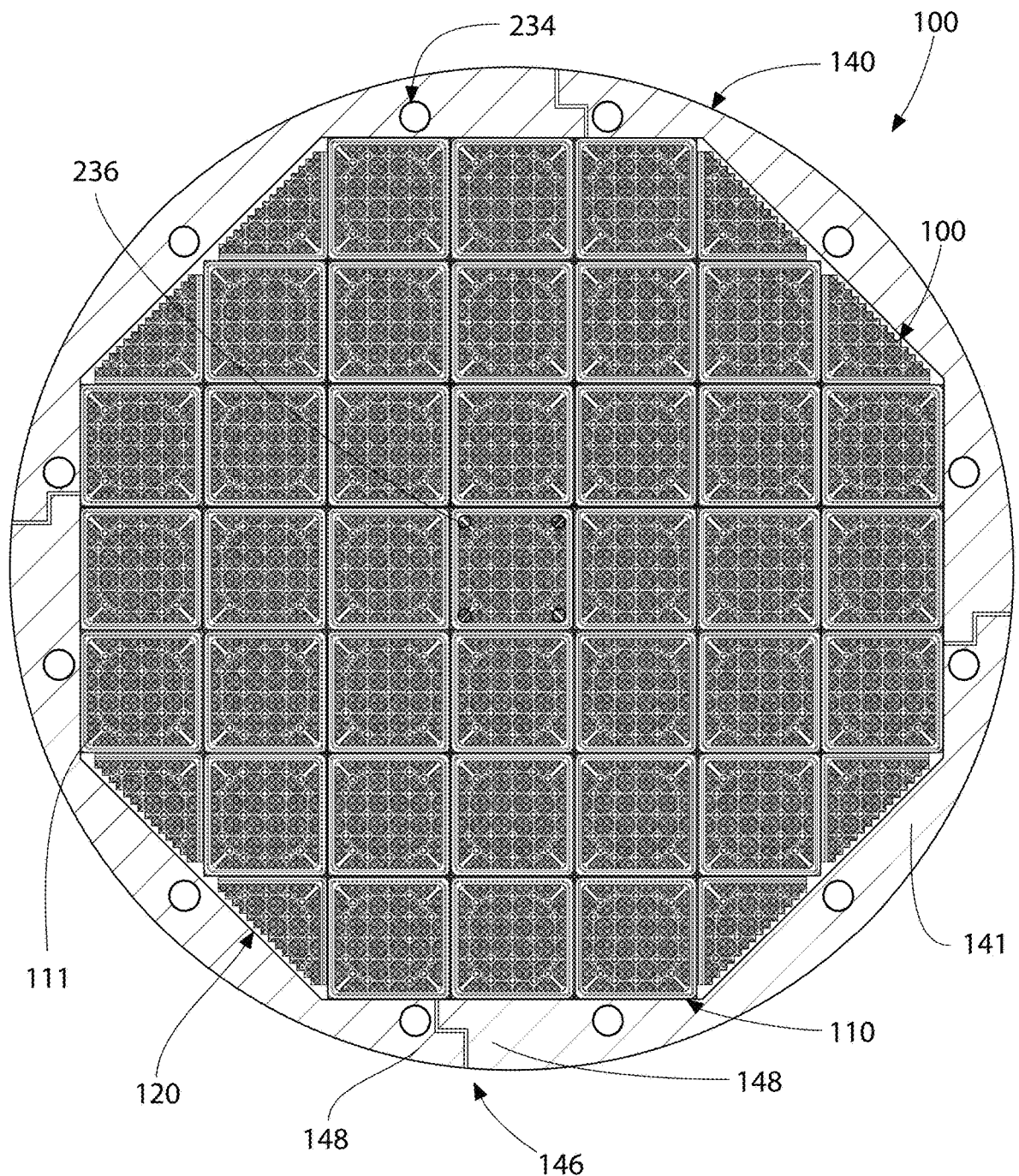
FIG. 3 is a transverse cross-sectional view through the nuclear fuel cartridge of FIG. 1 FIG. 1.
Figure 10:
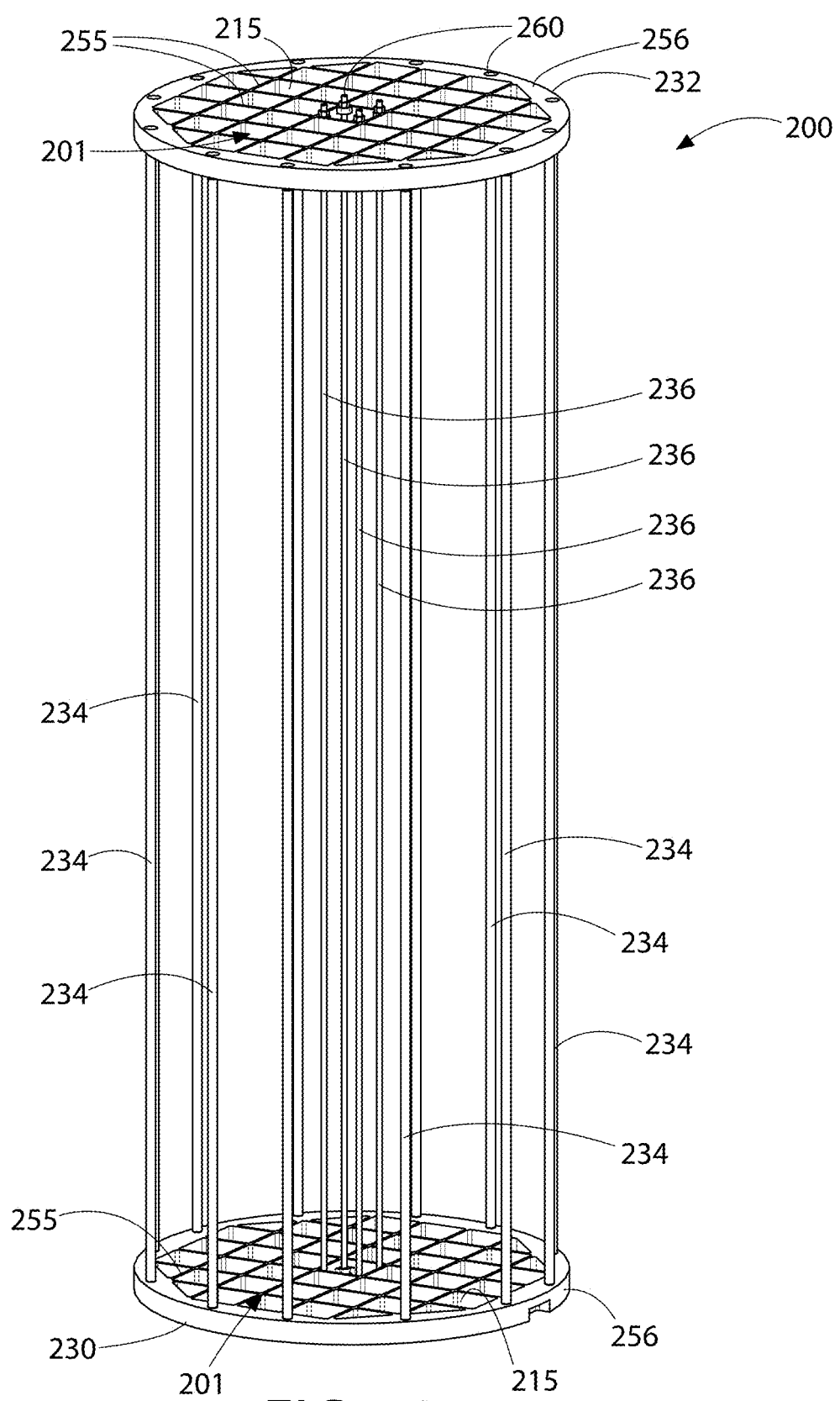
FIG. 10 is a perspective view of a unitary support structure of the nuclear fuel cartridge of FIG. 1, wherein the nuclear fuel core and reflector cylinder have been removed.
Figure 11:
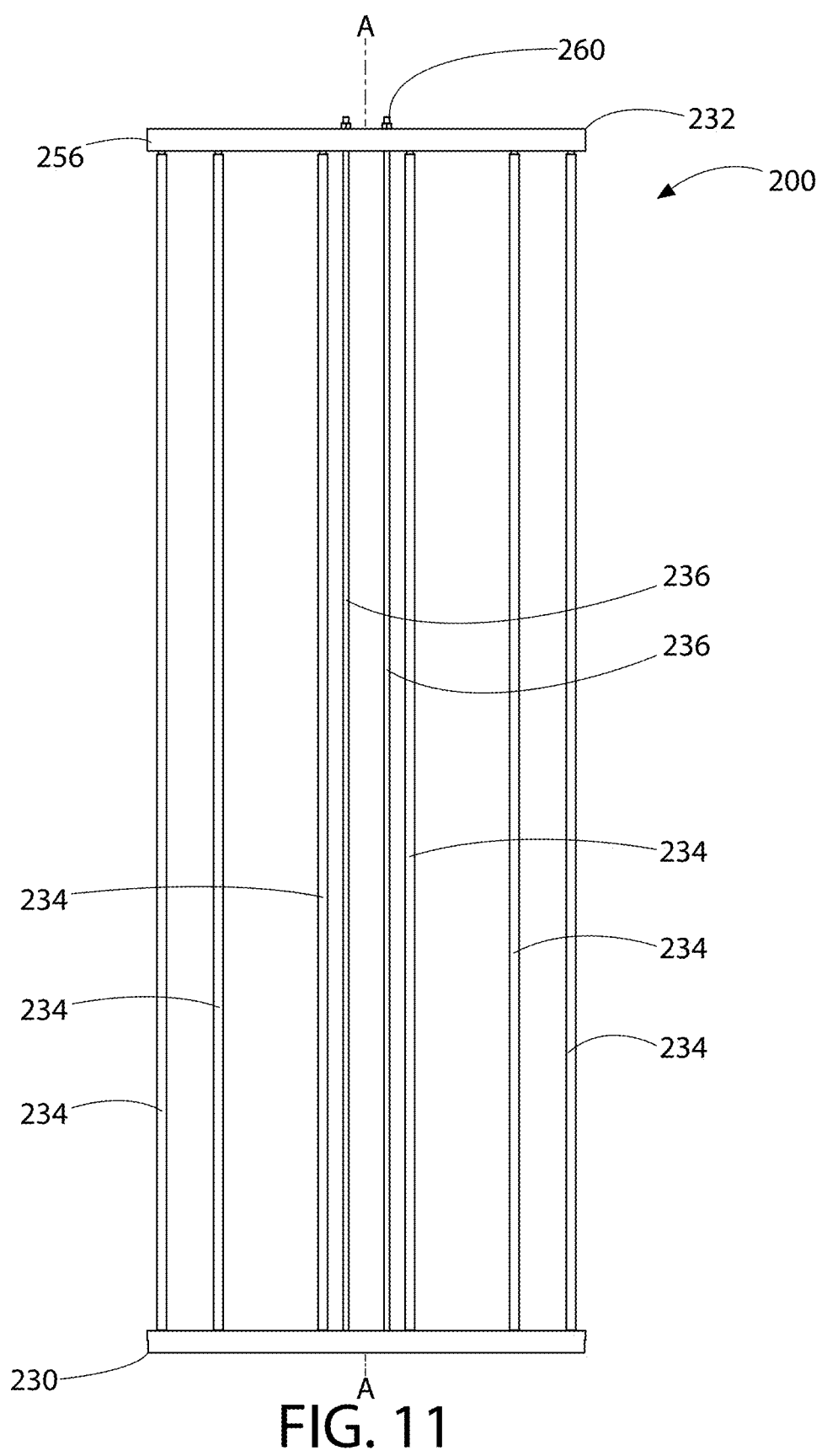
FIG. 11 is a side view of the unitary support structure of FIG. 10.
Figure 12:
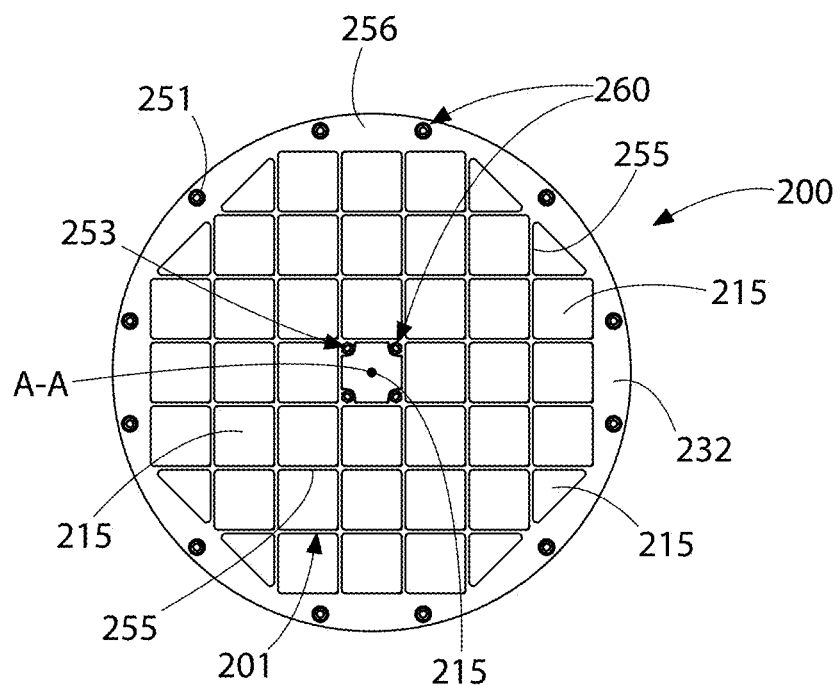
FIG. 12 is a top view of the unitary support structure of FIG. 10.
Figure 13:
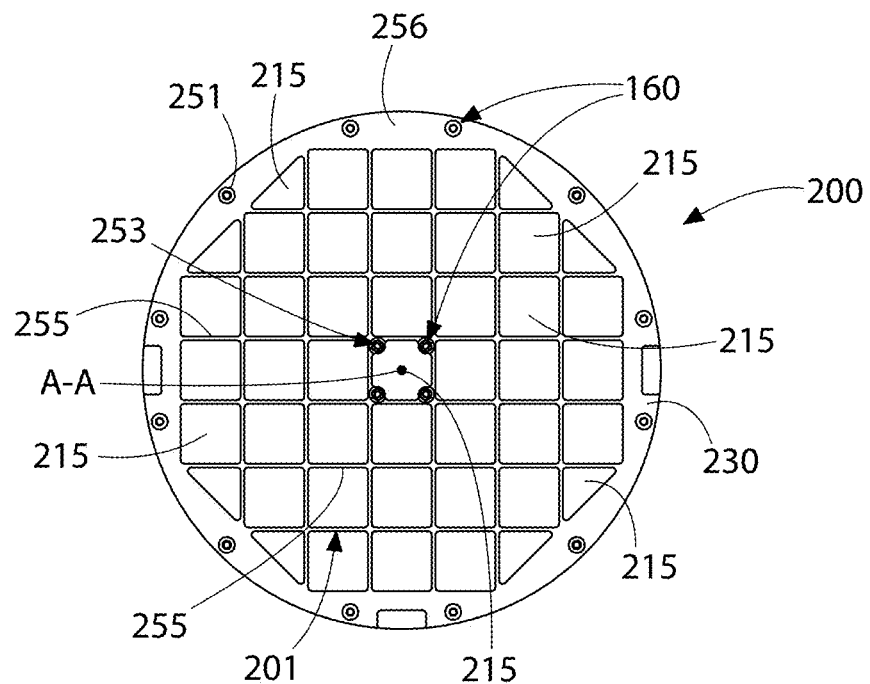
FIG. 13 is a bottom view of the unitary support structure of FIG. 10.

Referring now to FIGS. 1-3 concurrently, a portable nuclear fuel cartridge 1000 according to an embodiment of the present invention is illustrated. The portable nuclear fuel cartridge 1000 is a unitary, self-supporting construction that, in certain embodiments, can be free-standing when position on a horizontal surface. As discussed in greater detail below, the portable nuclear fuel cartridge 1000 comprises a unitary support structure 200 (shown in isolation in FIG. 10) and an integrated nuclear fuel core, which is exemplified as the nuclear fuel core 100 discussed above. While the nuclear fuel core 100 is particularly suited for use in the portable nuclear fuel cartridge 1000, it should be noted that the portable nuclear fuel cartridge 1000 can include a wide variety of nuclear fuel core arrangements and, in certain embodiments, is not limited to the arrangement particulars of the nuclear fuel core 100 described above. For example, in one such embodiment, the portable nuclear fuel cartridge 1000 can utilize a nuclear fuel core that includes only one type of nuclear fuel assembly, such as only the first fuel assemblies 1000 (or other types of fuel assemblies, such as hexagonal)

The portable nuclear fuel cartridge 1000, which includes an integrated nuclear fuel core 100 can be lifted and transported as a self-contained and self-supported structural unit. This allows for rapid fueling (which as used herein includes refueling) and defueling of the nuclear reactor vessel 500. Conceptually, the portable nuclear fuel cartridge 1000 may simply be plugged into or unplugged from a reactor vessel somewhat analogous to a self-contained power source like a typical battery. Due in part to the unitary construction of the portable nuclear fuel cartridge 1000 (with complete nuclear fuel core contained therein), the entire refueling outage duration for a nuclear reactor can be reduced to 5 days compared to a 30-day outage duration of modern reactors. Combined with a 48-month operating cycle, a nuclear reactor utilizing the portable nuclear fuel cartridge 1000 computes to have an installed availability factor of 99.6% (1455 days out of 1460 days), which has been unattainable heretofore in modern day reactors.

As exemplified, the portable nuclear fuel cartridge 1000 generally comprises the unitary support structure 200 (shown in isolation in FIG. 10), the nuclear fuel core 100 and a reflector cylinder 140. In cert embodiments, the reflector cylinder 140 may be omitted and incorporated into the nuclear react vessel 500 as described above. The nuclear fuel core 100 is mounted within the unitary support structure 200 (described in greater detail below) such that a self-supporting assemblage is collectively formed than can be lifted as a single unit.

Referring now to FIGS. 1-3 and 10-14 concurrently, the unitary support structure 200 is illustrated according to one embodiment of the present invention. The unitary support structure 200 is sufficiently strong to enable handling of the portable nuclear fuel cartridge 1000 within a margin of safety required by ANSI 14.6 (1993). While a specific structural embodiment of the unitary support structure 200 will be described below, it is to be understood that the unitary support structure 200 can take on wide variety of structural embodiments and configurations, including skeletal frameworks and enclosure-like housings.

The unitary support structure 200 generally comprises a bottom support structure 230 (exemplified as a bottom core plate), a top support structure 232 (exemplified as a top core plate), and a plurality of longitudinal members 234, 236 (exemplified as connecting rods) that interconnect the top and bottom support structures 232, 230. It is to be understood that while the top and bottom structures are referred to as top and bottom core plates herein, it is to be understood that these terms are used broadly to encompass any structure that can provide the requisite structural integrity for handling the load while allowing adequate fluid flow through the integrated nuclear fuel core 100.

The nuclear fuel core 100 is sandwiched between the top and bottom core plates 232, 230 so as to be incapable of being removed from the unitary support structure 200 without disassembling the unitary support structure 200. As can be seen each of the top and bottom core plates 232, 230 comprise a lattice structure (or gridwork) 201 that defines a plurality of open cells 215. Thus, each of the top and bottom core plates 232, 230 comprises a plurality of open cells 215.

The bottom and top core plates 130, 132 are each a honeycomb lattice structure, which has minimum cross sectional area and weight, but maximum flexural strength. This provides maximum open area for fluid flow in the vertical/axial direction. The resistance to flow can be customized by adding additional hydraulic resistance under each nuclear fuel assembly 110, 120 of the nuclear fuel core 100 to promote the desired distribution of water up-flow along and through each fuel assembly 110, 120 in the nuclear fuel core 100. As described in greater detail below, each of the plurality of open cells 215 of the top and bottom core plates 232, 230 fluidly communicate with at least one of the nuclear fuel assemblies 110, 120 of the nuclear fuel core 100 to form a fluid flow path through the nuclear fuel assemblies 110, 120.

Figure 14:
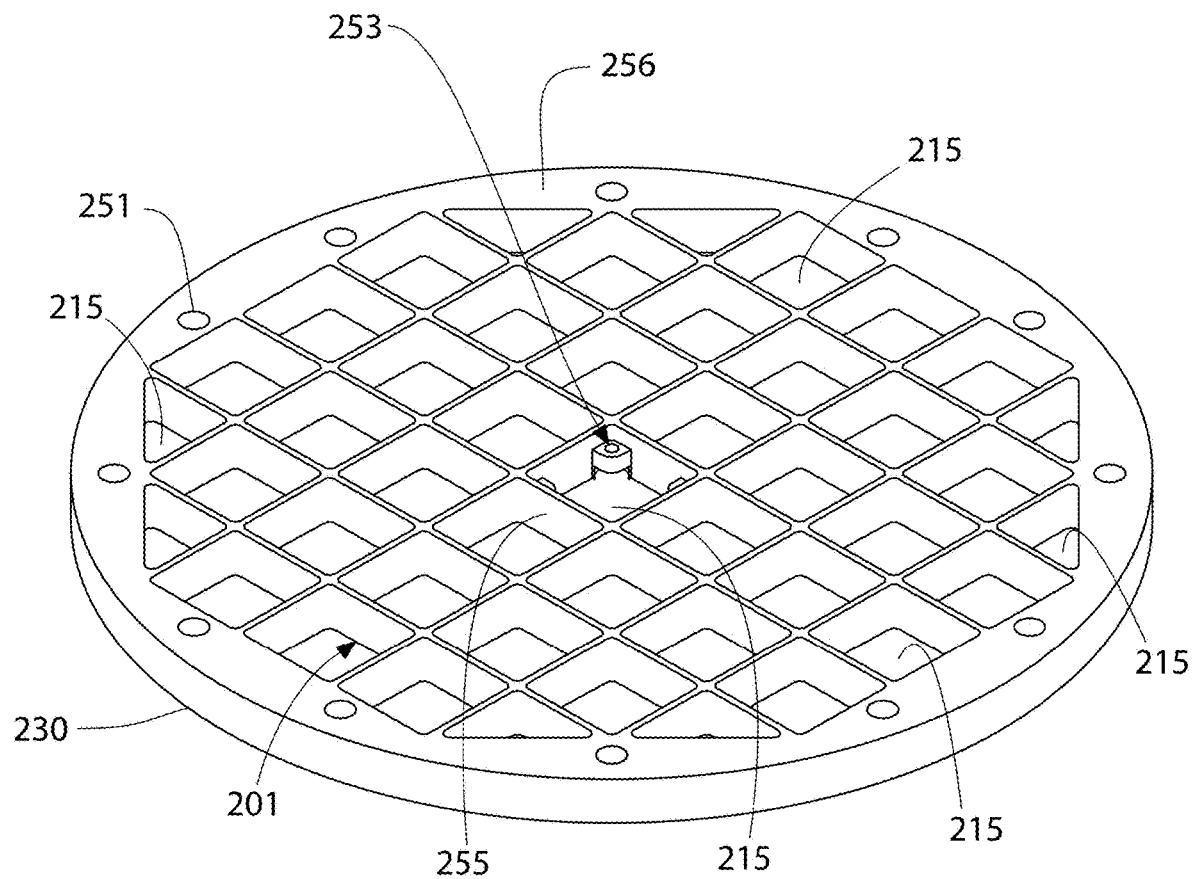
FIG. 14 is a perspective view of a bottom core plate of the unitary support structure of FIG. 10.
Figure 15:
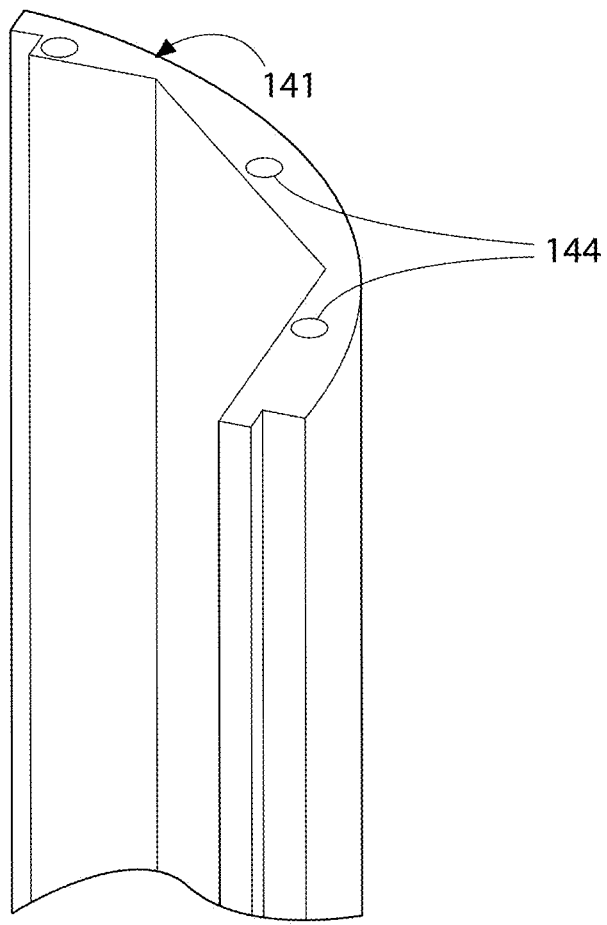
FIG. 15 is a close-up view of the top portion of one of the arcuate segments of the reflector cylinder of the nuclear fuel cartridge of FIG. 1.

While the bottom core plate 130 is depicted in FIG. 14, it is to be understood that the top core plate 132 may have a similar construction. Thus, the description below is applicable to both the bottom and top core plates 232, 230. The lattice/gridwork 201 is formed created by an array of intersecting grid plates 255 that are supported within an annular rim 256. The plurality of open cells 215 are created by the array of intersecting grid plates 255. The open cells 215 define passageways which are each configured and dimensioned to conform to the configuration of a respective one of the first or second nuclear fuel assemblies 110, 120 that are aligned therewith. When installed in the nuclear reactor during operation, this forms a primary reactor coolant flow paths through the portable nuclear fuel cartridge 1000 (in conjunction with the top and bottom nozzles 152, 154 of the fuel assemblies). Accordingly, the open cells 215 may each have a polygonal configuration in top plan view in one embodiment which coincides with an associated nuclear fuel assembly 110, 120. Thus, in one embodiment, the open cells 215 intended for the first nuclear fuel assemblies 110 may be square in configuration while the open cells 215 intended for the second nuclear fuel assemblies 120 may be triangular in configuration. These open cells 215 are arranged in pattern that corresponds to the pattern formed by the first and second nuclear fuel assemblies 110, 120 of the nuclear fuel core 100. In one arrangement, the triangular shaped open cells 215 are located near the periphery of the top and bottom core plates 232, 230. In the exemplified embodiment, the open cells 115 collectively form a pattern having an octagonal shape in top plan view that matches the nuclear fuel core 100.

Turning back to the structure of the unitary support structure 200, the plurality of longitudinal members interconnect the top and bottom core plates 232, 230 at a fixed distance from one another. In the exemplified embodiment, the longitudinal members comprise a plurality of connecting rods 234, 236 extending axially between the top and bottom core plates 232, 230. As exemplified, the plurality of connecting rods comprise a plurality of peripheral connecting rods 234 located outboard of the nuclear fuel core 100 and a plurality of central connecting rods 236 located inboard of the nuclear fuel core 100.

The plurality of peripheral connecting rods 234 are circumferentially arranged around a periphery of the self-supporting assemblage formed by the combination of the unitary support structure 200 and the nuclear fuel core 100. In the exemplified embodiment, the plurality of peripheral connecting rods 234 are circumferentially arranged around the periphery in a substantially equi-spaced arrangement. The peripheral connecting rods 234 extend through mounting holes 251 formed through and around the periphery of the top and bottom core plates 232, 230 (in the annular rim 256). As discussed below, the holes 251 are concentrically alignable with through-passageways 144 of the reflector cylinder 140 so that the peripheral connecting rods 234 can be used to coupled the reflector cylinder 140 to the unitary support structure 200.

The plurality of central connecting rods 236 are located adjacent a central axis A-A of the self-supporting assemblage formed by the combination of the unitary support structure 200 and the nuclear fuel core 100. The central connecting rods 236 pass through the space created by modifying the corners of the centrally located open cells 215 of both of the top and bottom core plates 232, 230, The first nuclear fuel assembly 110 positioned mounted in the central cells 215 of the top and bottom core plates 232, 230 is modified to include notches in its corners to accommodate the plurality of central connecting rods 236. The central cell 215 includes corner brackets 253 formed in each of the four corners at the intersections of the grid plates 155. The brackets 253 include holes configured to pass the central connecting rods 234 therethrough. The central connecting rods 236 help ameliorate the bending stress in the bottom core plate 230, which carries the dead weight of the nuclear fuel core 100 during lifting and handling of the portable nuclear fuel cartridge 1000 for various operations. In some embodiments, however, the central connecting rods 236 may be omitted.

In one embodiment, the top and bottom core plates 232, 230 may be coupled together using the connecting rods 234, 236 with suitable mounting hardware 260. The mounting hardware 260 may include washers and hex nuts configured to engage threaded ends of the connecting rods 234, 236. Other suitable mounting hardware or means to couple the bottom and top core plates 230 232 may be used, such as welding. In one embodiment, the top and bottom core plates 232, 230 are removably coupled together to allow the nuclear fuel cartridge 100 to be removed.

In one embodiment, the unitary support structure 200 may further include an integral lifting ring 270 to facilitate lifting and handling of the portable nuclear fuel cartridge 1000, such as by a crane and/or with appropriate rigging. In on embodiment, the lifting ring 270 is fastened or otherwise fixed to the top core plate 232. Any suitable means of connection could be used. In one possible embodiment, the peripheral connecting rods 234 that join the top and bottom core plates 232, 230 together using mounting hardware 260 may be used to attach the lifting ring 270 to the top core plate 232. Other suitable attachments methods may be used in addition to or instead of using the peripheral connecting rods 234, such as welding, fasteners, or the like. The foregoing are only some possible, non-limiting examples.

Referring now to FIGS. 1-3 and 15, the portable nuclear fuel cartridge 1000 may also include, in certain embodiments, a reflector cylinder 140 coupled to the unitary support structure. The reflector cylinder 140 may be a hollow tubular walled structure which extends vertically and defines a substantially circular interior compartment (in transverse cross-section) for enclosing the nuclear fuel core 100.

In one embodiment, the reflector cylinder 140 may be comprised of individual arcuately-shaped reflector wall segments 141 which are circumferentially joined together by longitudinally-extending flanged joints 146 formed by vertical flanges 148 formed on each lateral side 149 of a segment. In one embodiment, the flanged joints 146 formed between adjoining reflector wall segments 141 may be interlocking lap joints in design having a step-shaped joint configuration as shown so that a portion of each segment lateral side 149 overlaps the lateral end of the adjacent reflector segment to eliminate any straight pathways through the reflector cylinder 140 for neutrons to escape. Various other suitable configurations are possible. As noted herein, the reflector cylinder 140 reflects the neutrons escaping from the nuclear fuel core 100 back inwards towards the nuclear fuel core 100. The reflector wall segments 141 of reflector cylinder 140 may be made of any suitable metallic material operable having neutron reflecting properties.

The reflector cylinder 140 can be coupled to the unitary support structure 200 in a variety of manners, such as fastening, welding, or interference fit. In on embodiment, the reflector cylinder 140 is coupled to the unitary support structure 200 using the peripheral connecting rods 234 that also join the bottom and top plates 230, 232. In this embodiment, the peripheral connecting rods 234 pass through longitudinally-extending passageways 144 formed in each reflector wall segment 141. In the exemplified embodiment, the longitudinally-extending passageways 144 are located on flanges that protrude inward from the reflector wall segment 141.

As mentioned above, the peripheral connecting rods 234 also extend through the mounting holes 251 formed through and around the periphery of the top and bottom core plates 232, 230 in the annular rim 256. The holes 251 are axially alignable with through passageways 144 of the reflector wall segments 141 to pass the connecting rods 234 therethrough. The flanged joints 146 between adjoining reflector wall segments 141 in some embodiments may be held together by the foregoing assembly of the bottom and top core plates 230, 232 and the peripheral connecting rods 234 without any direct mechanical coupling between the flanges 148 of the reflecting segments.

When coupled to the unitary support structure 200, the reflector cylinder 140 circumscribes the nuclear fuel core 100. In some embodiments, the reflector cylinder 140 may be omitted from the portable nuclear fuel cartridge 1000.

Referring now to FIGS. 5A and 6-9 concurrently, a single one of the first fuel assemblies 110 is illustrated. Each first fuel assembly 110 includes a plurality of fuel rods 111, longitudinally spaced grid sheets 113 (that include a plurality of openings through which the plurality of fuel rods 111 extend), a plurality of control rods 150, a top nozzle 152, and a bottom nozzle 154. The top and bottom nozzles 152, 154 are disposed at opposing top and bottom ends 157, 158 of the first nuclear fuel assembly 110. In one embodiment, the top and bottom nozzles 152, 154 are open structures defining a central flow opening and may be formed by adjoining peripheral plates having a polygonal configuration in top plan view, and in some embodiments a rectilinear configuration.

In one embodiment, the top and bottom flow nozzles 152, 154 are configured and dimensioned to engage the top and bottom core plates 130, 132 respectively of the portable nuclear fuel cartridge 1000 so that the first nuclear fuel assemblies 110 cannot be completely passed through the open cells 215 of the top and bottom core plates 232, 230. Thought of another way, each of the plurality of fuel assemblies 110, 120 are sized and/or shaped so as to be incapable of being removed from the unitary support structure 200 through the open cells 215 of the top and bottom core plates 232, 230 with which it is in fluid communication. This allows the first nuclear fuel assemblies 110 to be removably locked into the top and bottom core plates 232, 230 when the portable nuclear fuel cartridge 1000 is being assembled.

Accordingly, in one embodiment, each of the nuclear fuel assemblies 110, 120 comprises a top portion (which in the exemplified embodiment comprises the top nozzle 152) that at least partially nests within one of the plurality of open cells 215 of the top core plate 232 and a bottom portion (which in the exemplified embodiment comprises the bottom nozzle 154) that at least partially nests within one of the plurality of open cells 215 of the bottom core plate 230. In embodiments where the top and bottom nozzles 152, 154 may be omitted other cap or sleeve structures could be used in their stead.

Furthermore in order to ensure that the nuclear fuel assemblies 110, 120 cannot be completely passed through the open cells 215 of the top and bottom core plates 232, 230, the top portion of each of the nuclear fuel assemblies 110, 120 comprises a top shoulder element (exemplified as stepped portion 180) that abuts a bottom surface of the top core plate 232. Similarly, the bottom portion of each of the nuclear fuel assemblies 110, 120 comprises a bottom shoulder element (also exemplified as stepped portion 180) that abuts a top surface of the bottom core plate 230. In other embodiments, the top and/or bottom shoulder elements can take the form of a protuberance, pin, flange, or any other structure capable of mechanically interfering with the lattice structure/gridwork 201 in a manner that prevents the nuclear fuel assemblies 110, 120 from being slid completely through the open cells 215. In still another embodiment, top and/or bottom shoulder elements can be formed by a sloped section/wall of the nuclear fuel assemblies 110, 120.

The top nozzle 152 and the bottom nozzle 154 each include the stepped portion 180 which, as mentioned above, is configured to engage the grid plates 255 defining the open cells 215 of the top and bottom core plates 232, 230, thereby preventing the fuel assemblies 110, 120 from passing completely through the open cells 215 in which they nest. In the exemplified embodiment, the stepped portion 180 is formed in the peripheral lateral sides 181 of each flow nozzle 152, 154. The stepped portion 180 may extend partially or completely around the perimeter of the sides 181 of the top and bottom nozzles 152, 154 and be intermittent or continuous in configuration. The stepped portion 180 of top and bottom nozzles 152, 154 defines an outer insertion end portion 182 configured to extend at least partially into the open cells 115 of the bottom and top core plates 230, 232 and an inner end portion 183 configured to have a larger cross sectional width than the open cells 215 so as to remain outside of the open cells 215 when the insertion end portion 182 of the top and bottom nozzles 152, 154 are inserted into the open cells 215.

As opposed to prior reactor core arrangements wherein the core plates are permanently affixed inside the reactor vessel and the fuel assemblies must be individually inserted one at a time through openings in the fixed plates, the foregoing present arrangement and configuration of the bottom and top core plates 230, 232 and top and bottom flow nozzles 152, 154 advantageously permit the fuel assemblies 110, 120 to be compressed between the top and bottom core plates 232, 230 to form a self-supporting and free standing structure.

In some embodiments, the top and bottom nozzles 152, 154 may further have a transverse cross-sectional shape which complements the cross-sectional shape of the first fuel assembly 110. In one embodiment, the top and bottom nozzles 152, 154 may have a square shape in top plan view. The top and bottom nozzles 152, 154 provide flow outlets and inlets for the nuclear fuel core 100, allowing the reactor primary coolant to flow through the core 100 from end to end and pick up heat from the fuel rods 111.

Figure 5A:
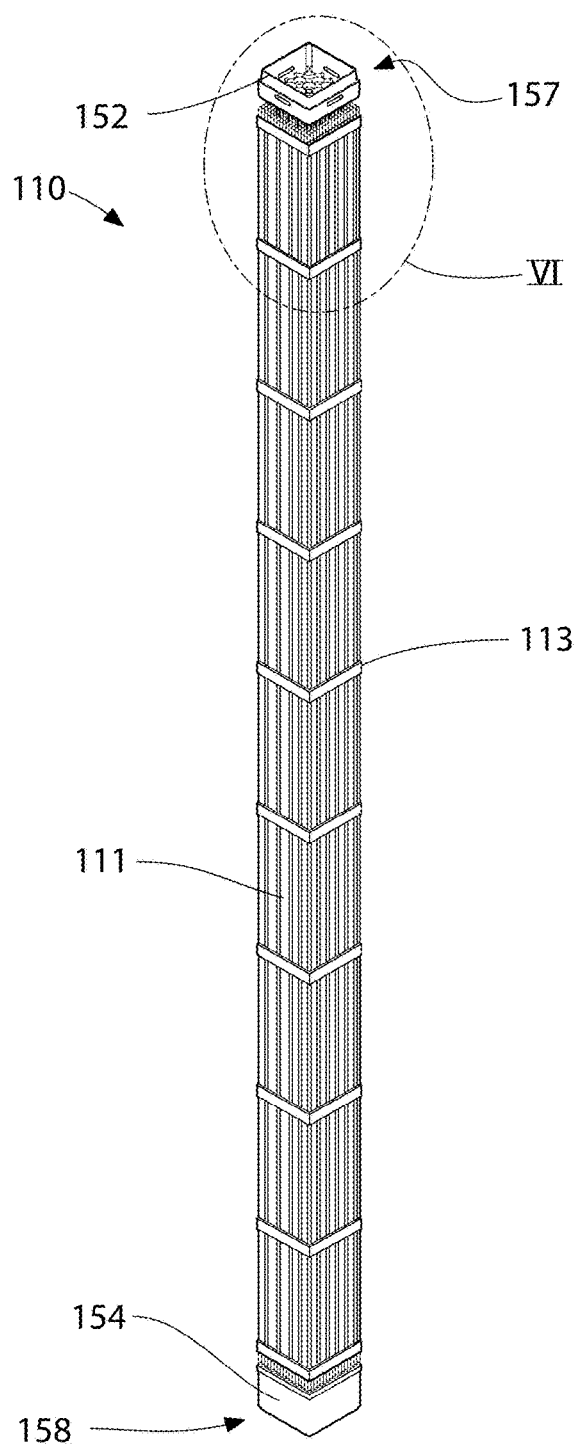
FIG. 5A is a perspective view of a first nuclear fuel assembly having a first transverse cross-sectional configuration removed from the nuclear fuel core of FIG. 4, the first transverse cross-sectional configuration comprising a rectangular transverse cross-sectional shape as exemplified.
Figure 5B:
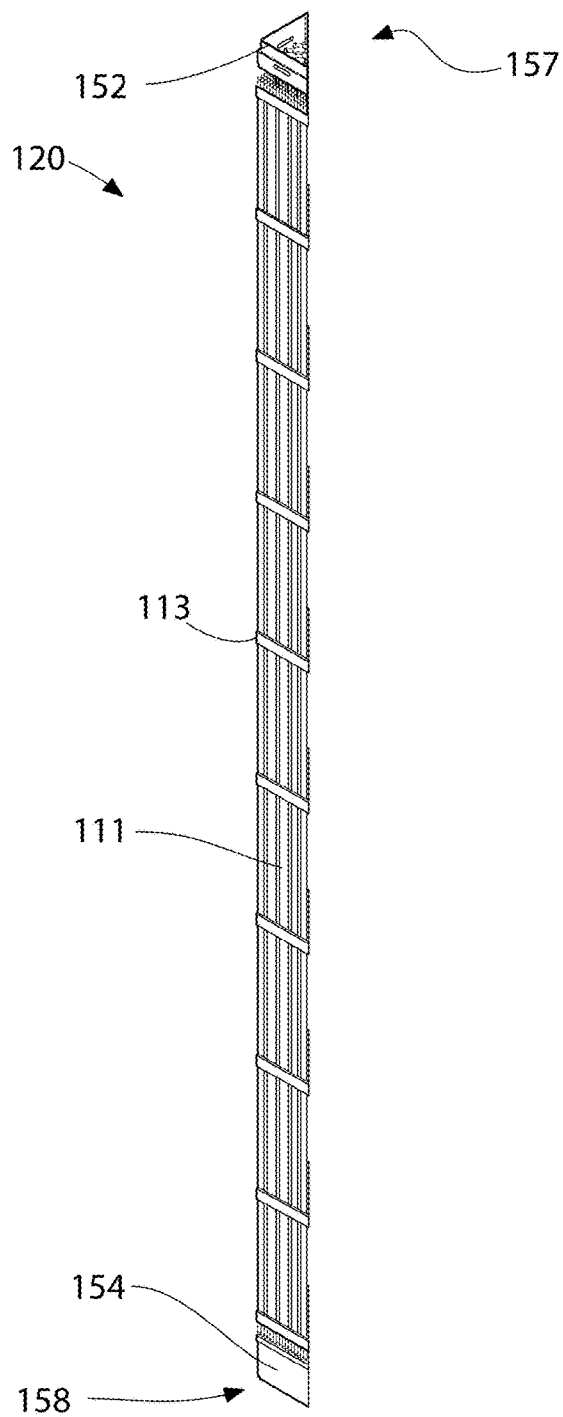
FIG. 5B is a perspective view of a second nuclear fuel assembly having a second transverse cross-sectional configuration removed from the nuclear fuel core of FIG. 4, the second transverse cross-sectional configuration comprising a triangular transverse cross-sectional shape as exemplified.
Figure 6:
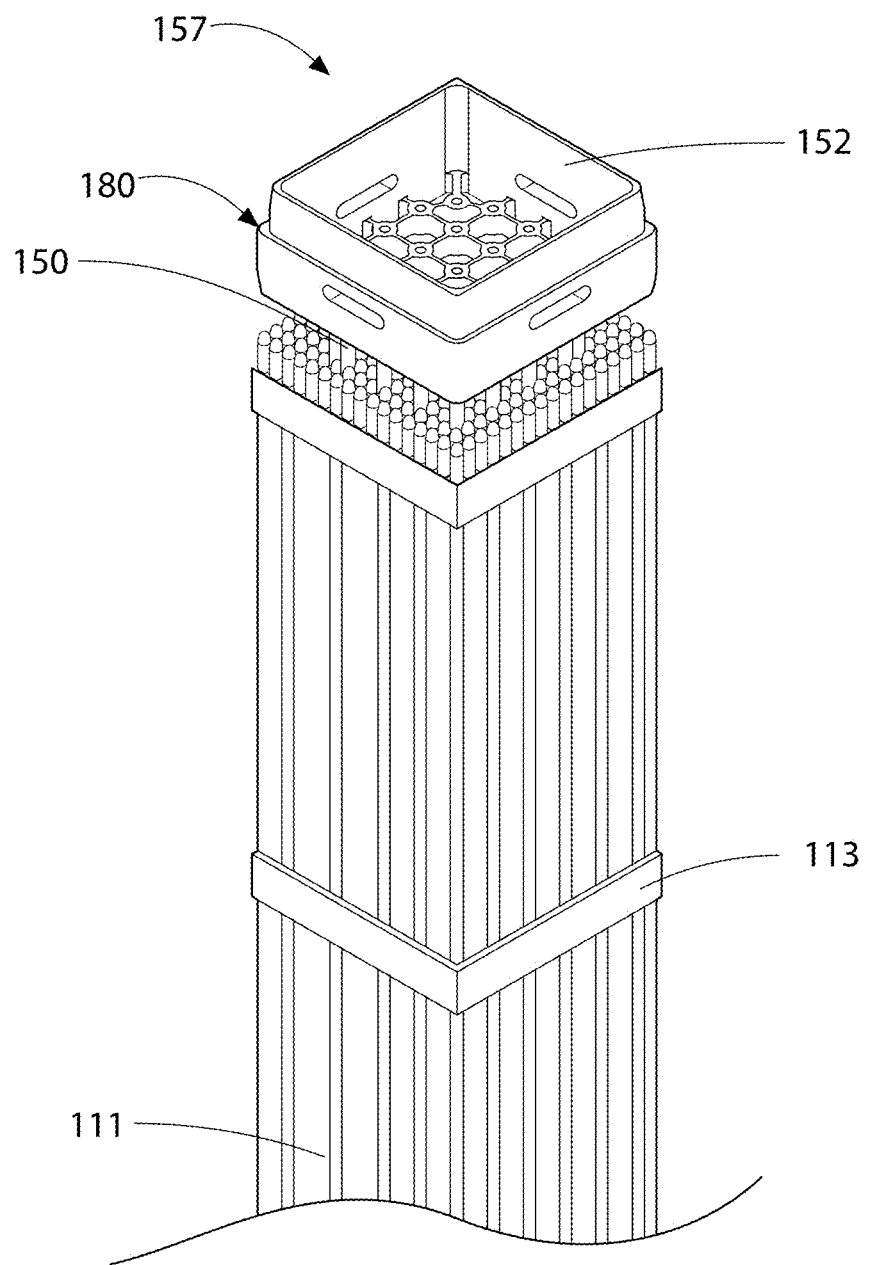
FIG. 6 is a close-up view of the top portion of the first nuclear fuel assembly of FIG. 5B taken at area VI.

As shown in FIG. 5B, the second nuclear fuel assemblies 120 may be similar in construction to the first fuel assemblies 110 described above, having fuel rods 111, top and bottom nozzles 152, 154, control rods 150, and grid sheets 113. The exception being that the components have a three-sided configuration instead of a four-sided configuration.

Having described the structure of the portable nuclear fuel cartridge 1000, an exemplary method for assembling the portable nuclear fuel cartridge 1000 will now be briefly described. The assembly process may begin by first generally positioning the fuel assemblies 110, 120 between top and bottom core plates 232, 230. The flow nozzles 252, 254 of the fuel assemblies 110, 120 are axially aligned with a respective open cell 215 in the top and bottom core plates 232, 230. Next, the process includes partially inserting the insertion end portion 182 of the top flow nozzle 152 of each of the fuel assemblies 110, 120 into an open cell 215 formed in the top core plate 232. This is done in one embodiment from the underside of the top core plate 232. The top nozzle 152 is now partially inserted into the open cell 215 and the shoulder portion 180 of the top nozzle 152 engages the top plate, more specifically the grid plates 155. The same process is repeated for the bottom nozzles 154 of the fuel assemblies 110, 120 in which the shoulder portions 180 of the bottom nozzles 154 are engaged with the bottom core plate 230 in a similar manner. This process may be conducted in any order or sequence, so that in some instances the bottom flow nozzles 154 may first be inserted into the bottom core plate 230 before the top flow nozzles 152 are inserted into the top core plate 232. Either approach is acceptable.

The assembly process continues by coupling the top and bottom core plates 232, 230 together using the plurality of connecting rods 234 and 236 (where used) extending between the core plates 230, 232 as described above. The threaded ends of the connecting rods 234, 236 are inserted through the holes 251 and the central mounting brackets 253 in the top and bottom core plates 232, 230. The mounting hardware 260 is installed on each connecting rod 234, 236. The nuts of the mounting hardware 260 are tightened, which in turn results in drawing the top and bottom core plates 232, 230 together with the connecting rods. The fuel assemblies 110, 120 are compressed between the top and bottom core plates 230, 232 to complete the portable nuclear fuel cartridge 1000 assembly process.

The assembled portable nuclear fuel cartridge 1000 defines a compact and versatile nuclear fuel core unit that may be installed in a reactor vessel 500 of any suitable configuration and in any appropriate orientation. FIG. 16 shows the portable nuclear fuel cartridge 1000 in one of many possible installations in a reactor vessel 500. The portable nuclear fuel cartridge 1000 is shown positioned inside a nuclear reactor vessel 500 which is located in a nuclear reactor containment enclosure 505 including a wet well. The reactor vessel 500 includes a primary coolant inlet/outlet nozzle 510 and a removable nuclear reactor vessel head 520 which provides access to an interior cavity 515 of the nuclear reactor vessel 500 configured for receiving and supporting the portable nuclear fuel cartridge 1000, as shown. In one embodiment, the portable nuclear fuel cartridge 1000 may be positioned in a riser pipe 525 disposed inside the reactor vessel 500; however, other suitable mounting arrangements may be used. In one embodiment, the fuel cartridge 1000 may be oriented vertically and primary coolant in the reactor vessel may flow upwards through the fuel cartridge 1000 and reactor core fuel assemblies 110, 120 entering the bottom core plate 230 and leaving the top core plate 232. The primary coolant is heated as it flows through the fuel assembly core 100 in passing by the fuel rods 111 in a manner well known in the art. The primary coolant in the reactor vessel 500 enters the bottom core plate 230 and a bottom nozzle 254 of the fuel assemblies 110, 120, flows in parallel along the fuel rods 111, and exits the top nozzle 252 and top core plate 232. It will be appreciated that in some embodiments, the partial fuel assemblies 120 may optionally be omitted.

Methods of Fueling a Nuclear Reactor

Referring now to FIG. 16, a method of fueling a nuclear reactor 500 according to the present invention will be described. While the inventive method is described below in conjunction with the portable nuclear fuel cartridge 1000 described above, it is to be understood that the method is not so limited in al embodiments and different structural embodiments of a portable nuclear fuel cartridge can be utilized.

The method may include: opening a reactor vessel 500 defining an interior cavity 515; loading the fuel cartridge 1000 into the cavity 515; and closing the reactor vessel 500. Because the fuel cartridge 1000 comprises an integrated fuel core 100, there is no need to manipulate and handle individual fuel assemblies 110 or 120 on site when initially fueling the reactor vessel 500. The entire fuel cartridge 1000 is merely lifted and transported to the reactor vessel 500 and then inserted or plugged into the reactor vessel 500 after removing the nuclear reactor vessel head 520 from the nuclear reactor vessel body. The top head closure 220 is then re-closed. If a spent fuel cartridge 1000 is in place in the reactor, this spent unit would first be removed from the reactor vessel 500 to make room for the new fuel cartridge 1000. Advantageously, the fuel cartridge 1000 with all of the fuel assemblies 110, 120 installed may be assembled outside of the reactor vessel 500 and containment enclosure, either elsewhere on site or off site. Since the fully assembled and complete fuel cartridge 1000 is ready to go, the duration of a refueling outage may be greatly reduced thereby saving labor, time, and financial resources.

Another method of fueling a nuclear reactor will now be described, in which the method comprises: a) opening a nuclear reactor vessel; b) moving a nuclear fuel cartridge from a position outside of the nuclear reactor vessel to a position within an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) closing the nuclear reactor vessel. The nuclear fuel cartridge is moved as a single unit.

The step of opening the nuclear reactor vessel may include setting a water level in a reactor containment enclosure to allow access to head bolts that secure a nuclear reactor vessel head to a nuclear reactor vessel body, removing the head bolts, and raising the water level and removing the nuclear reactor vessel head from the nuclear reactor vessel body to provide an opening into the interior cavity of the nuclear reactor vessel.

The step of opening the nuclear reactor vessel may comprise removing a nuclear reactor vessel head from a nuclear reactor vessel body to provide an opening into the interior cavity of the nuclear reactor vessel. The step of moving the nuclear fuel cartridge may comprise lowering the nuclear fuel cartridge into the nuclear reactor vessel body. The step of closing the nuclear reactor vessel may comprise securing the nuclear reactor vessel head to the nuclear reactor vessel body to enclose the opening into the interior cavity.

In certain embodiments, the step of moving the nuclear fuel cartridge may further comprise coupling a crane to the unitary support structure of the nuclear fuel cartridge, lifting the nuclear fuel cartridge with the crane, lowering the nuclear fuel cartridge into the nuclear reactor vessel body with the crane, and uncoupling the crane from the unitary support structure of the nuclear fuel cartridge. Coupling the crane to the unitary support structure may comprise coupling the crane to a lifting ring of the unitary support structure.

The fuel core of the nuclear fuel cartridge may comprise all nuclear fuel assemblies used to operate the nuclear reactor for a cycle life, which may be greater than 24 months in certain embodiments. During the moving step, the unitary support structure is sufficiently strong to enable handling of the nuclear fuel cartridge within a margin of safety required by ANSI 14.6 (1993).

Methods of Defueling a Nuclear Reactor

Referring now to FIGS. 17 to 36, a method of defueling a nuclear reactor 500 according to the present invention will be described. While the inventive method is described below in conjunction with the portable nuclear fuel cartridge 1000 described above, it is to be understood that the method is not so limited in al embodiments and different structural embodiments of a portable nuclear fuel cartridge can be utilized.

In one embodiment, the method of defueling a nuclear reactor comprises: a) opening a nuclear reactor vessel; b) removing a nuclear fuel cartridge from an interior cavity of the nuclear reactor vessel, the nuclear fuel cartridge comprising a unitary support structure, and a plurality of nuclear fuel assemblies arranged to collectively form a fuel core, the fuel core mounted in the unitary support structure; and c) submerging the nuclear fuel cartridge within a spent fuel pool.

Figure 17:
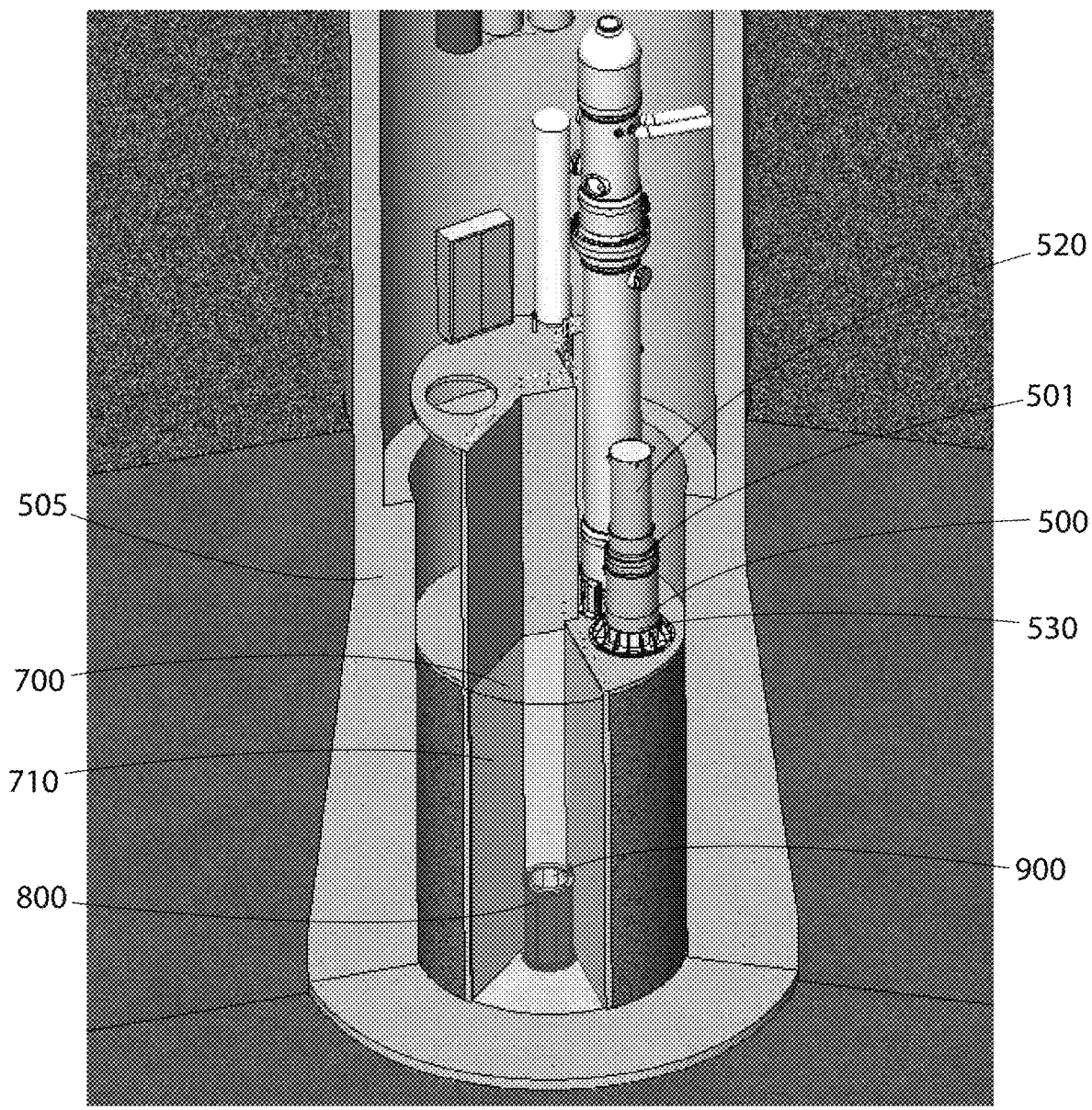
FIG. 17-24 schematically illustrate a method of defueling a nuclear reactor according to an embodiment of the present invention, wherein the nuclear fuel cartridge of FIG. 1 has been used to operate the nuclear reactor.

With reference to FIG. 17, in certain embodiments the step of opening the nuclear reactor vessel 500 may include setting a water level 700 in a reactor containment enclosure 505 to allow access to head bolts 501 that secure a nuclear reactor vessel head 520 to a nuclear reactor vessel body 530. Removing the head bolts 501. An open transfer cask 800, which includes an open multi-purpose canister 900 therein, may also be submerged in the spent nuclear fuel pool 710 at this time.

Figure 18:
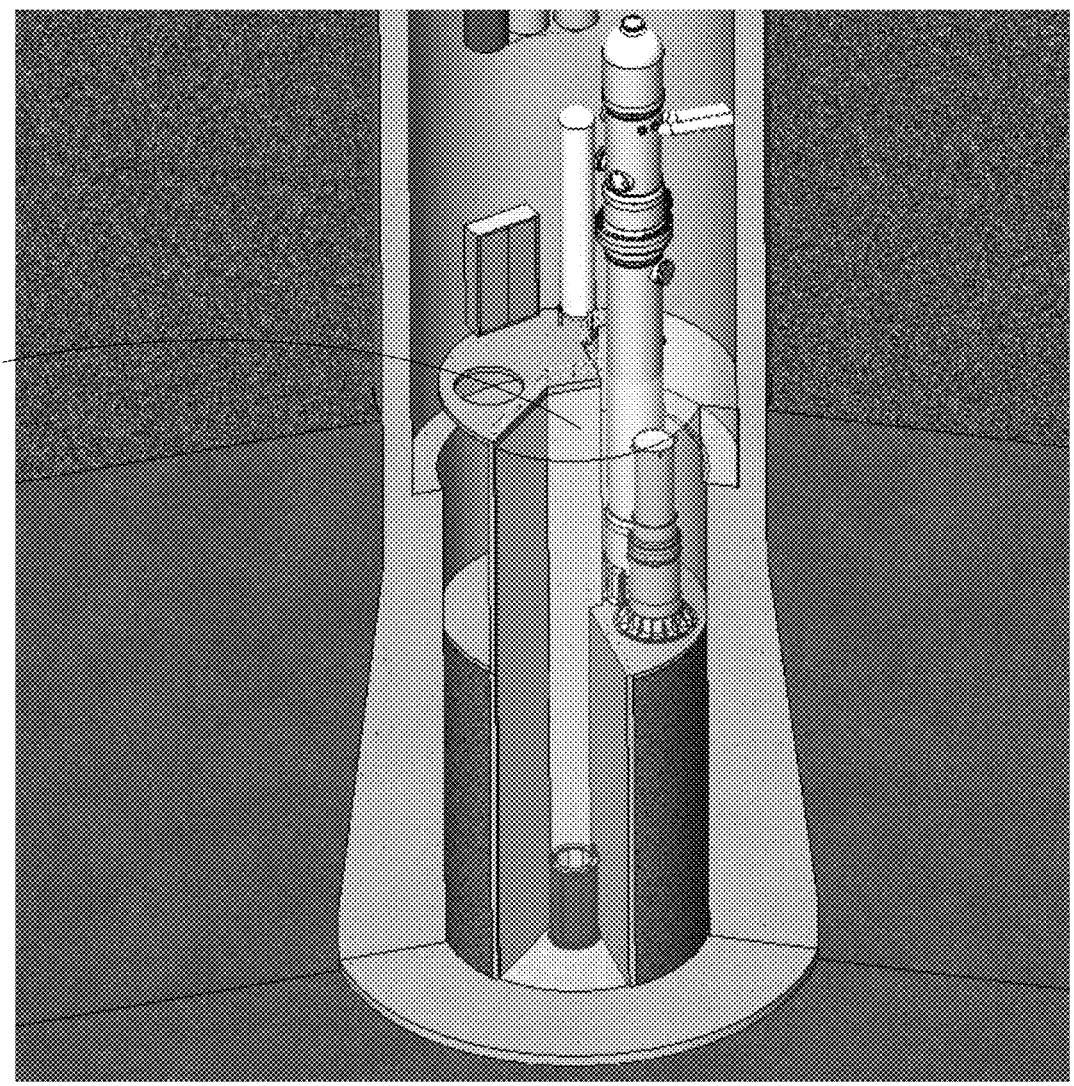
Figure 19:
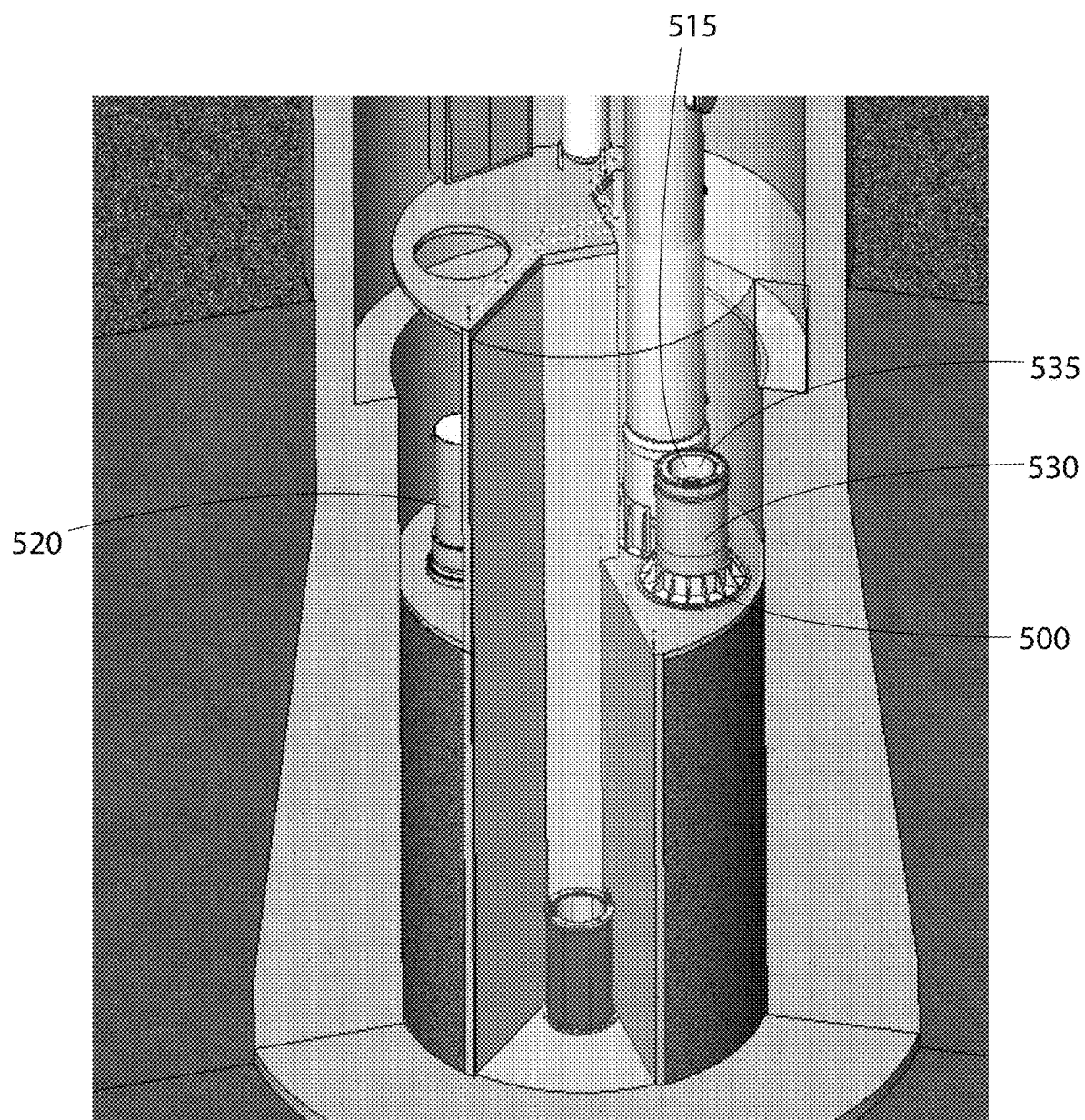

With reference now to FIG. 18, the water level 700 is then raised. With reference now to FIG. 19, and the nuclear reactor vessel head 520 is removed from the nuclear reactor vessel body 530 to provide an opening 535 into the interior cavity 515 of the nuclear reactor vessel 500.

Figure 20:
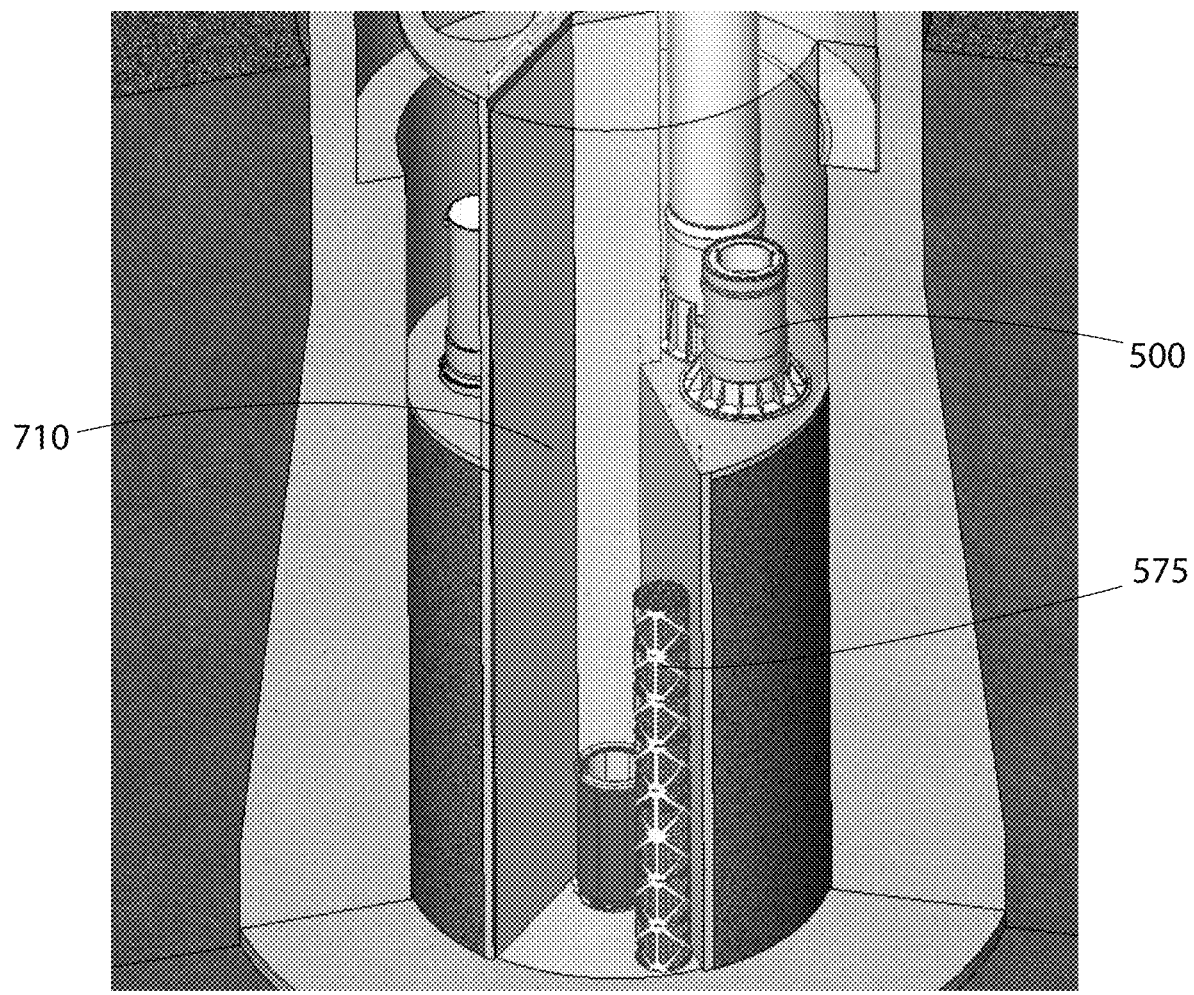
Figure 21:
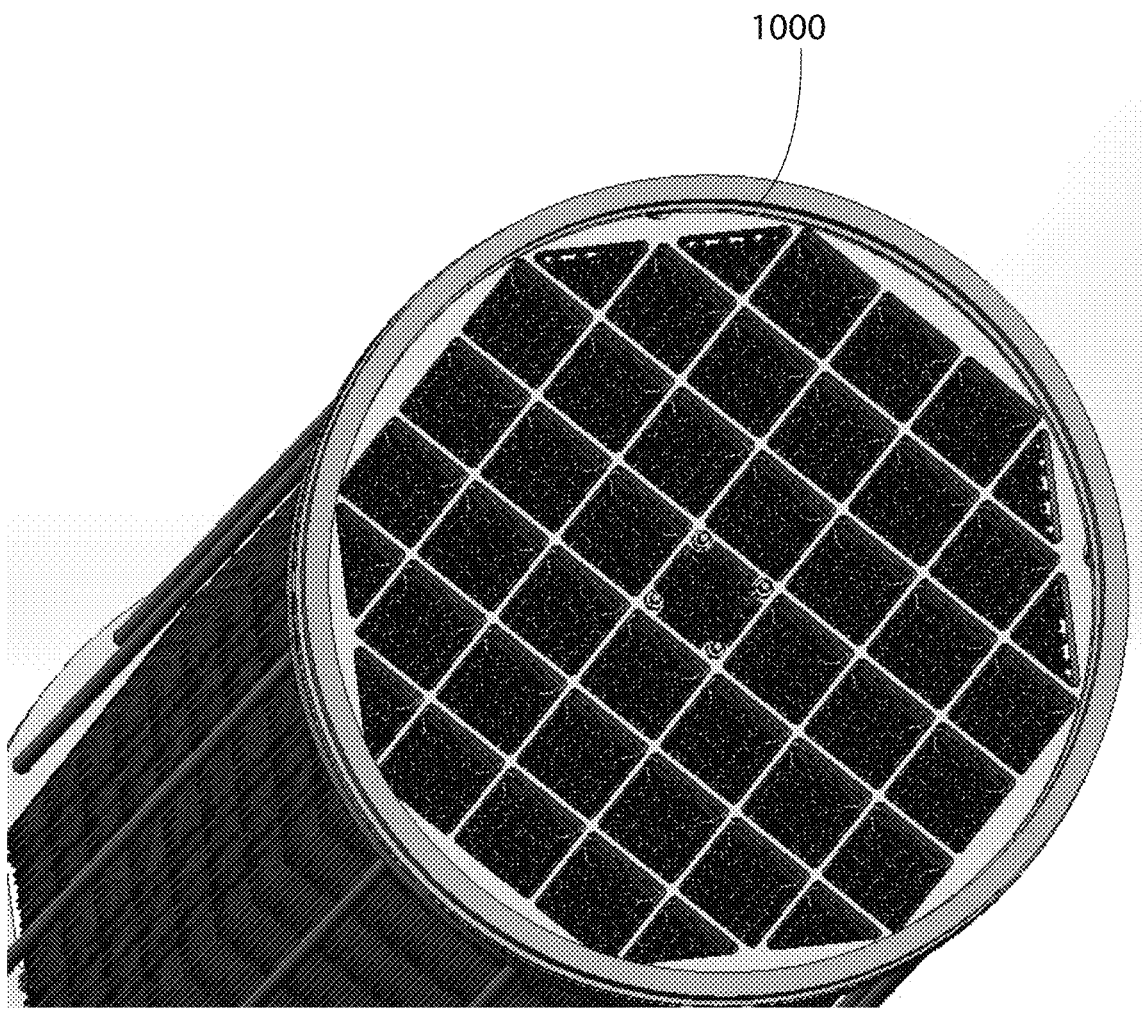

With reference now to FIG. 20, the control rod drive internals 575 are removed from the nuclear reactor vessel 500 and placed in the spent fuel pool 710. A crane (or other lifting mechanism) is then coupled to the unitary support structure 200 of the nuclear fuel cartridge 1000 (FIG. 21), which is located within the nuclear reactor vessel 500 as described above. In one embodiment, the crane is coupled to the lifting ring 270 of the unitary support structure 200. The nuclear fuel cartridge 1000 is then lifted out of the interior cavity 515 of the nuclear reactor vessel 500 with the crane.

It should apparent from the above that the nuclear fuel cartridge 100 is removed from the nuclear reactor vessel 500 as a single unit.

Figure 22A:
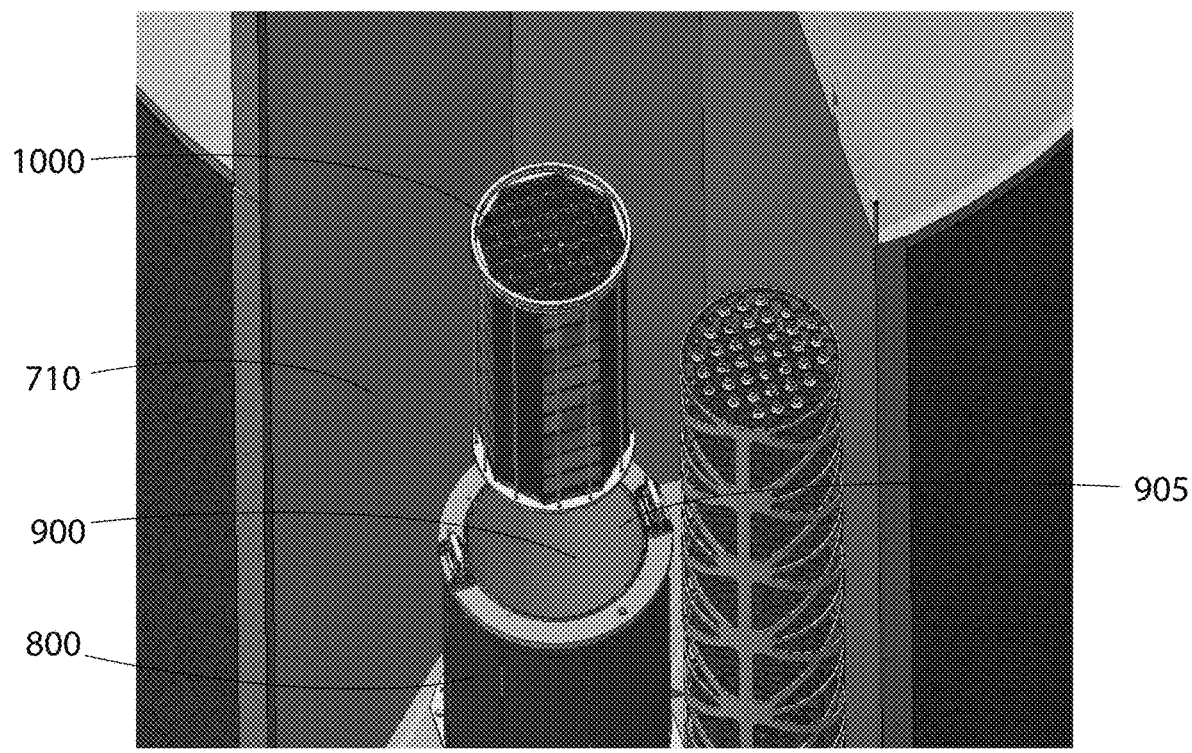
Figure 22B:
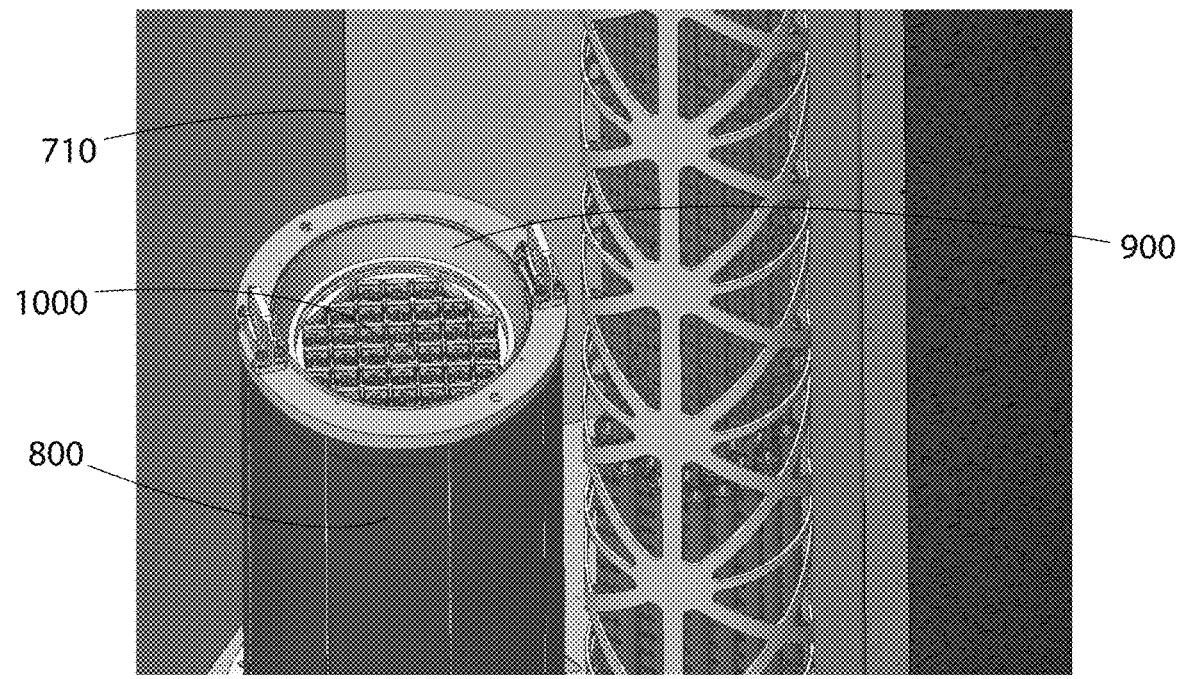

With reference now to FIGS. 22A-B concurrently, the nuclear fuel cartridge 1000 is then lowered into the spent nuclear fuel pool 710 and lowered into the cavity 905 of the open multi-purpose canister 900. As mentioned above, the open multi-purpose canister 900 may be positioned within an open transfer cask 800 at this time. 97. The nuclear fuel cartridge 1000 is lowered/submerged into the spent fuel pool 710 as a single unit.

Figure 23:
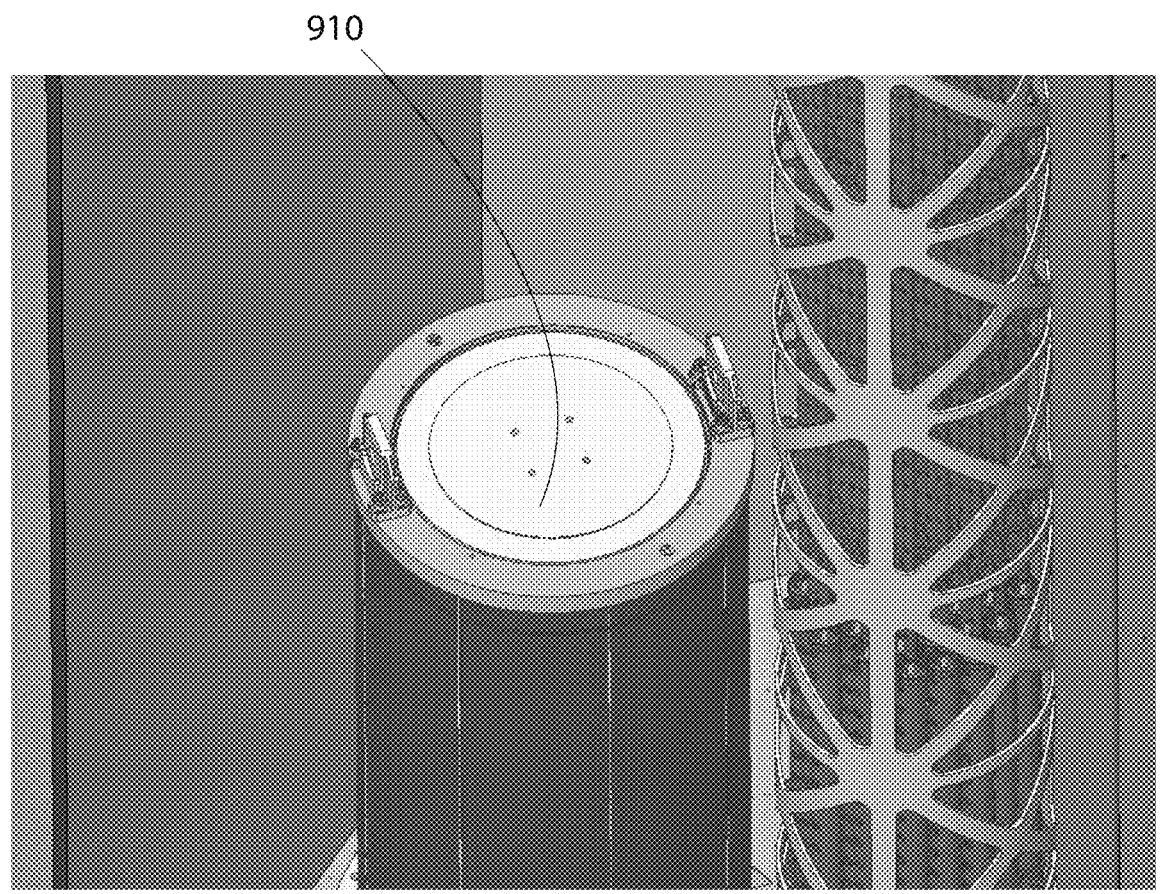
Figure 24:
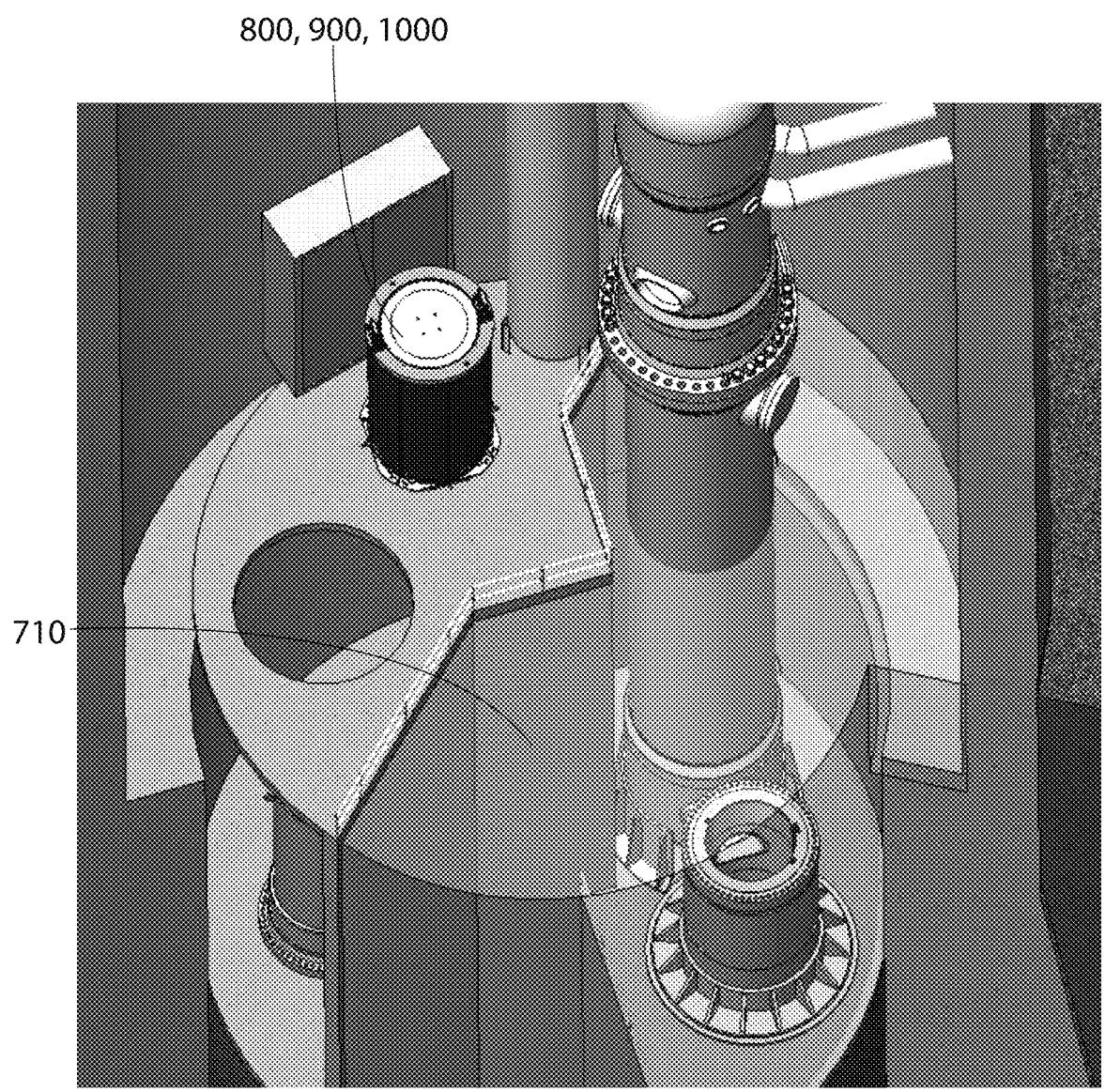

With reference now to FIG. 23, once the nuclear fuel cartridge is within the multi-purpose canister 900, the multi-purpose canister 900 is closed by positioning a canister lid 910 in place. With reference now to FIG. 24, the open cask 800 and closed canister 900 are then lifted from the spent fuel pool 710. The closed multi-purpose canister 900 is then prepared for dry storage. In one embodiment, this preparation includes draining bulk water from the closed multi-purpose canister 900, flowing a non-reactive gas through the closed multi-purpose canister 900 to achieve a level of dryness within the multi-purpose canister 900 suitable for dry storage, backfilling the closed multi-purpose canister 900 with a non-reactive gas, and sealing the closed canister. As a result of the above, the unitary support structure 200 of the nuclear fuel cartridge 1000 serves as a fuel basket within the multi-purpose canister 900. The multi-purpose canister 900, along with its load of the nuclear fuel cartridge 1000 is now ready for further transport and storage in a ventilated storage cask.

Figure 25:
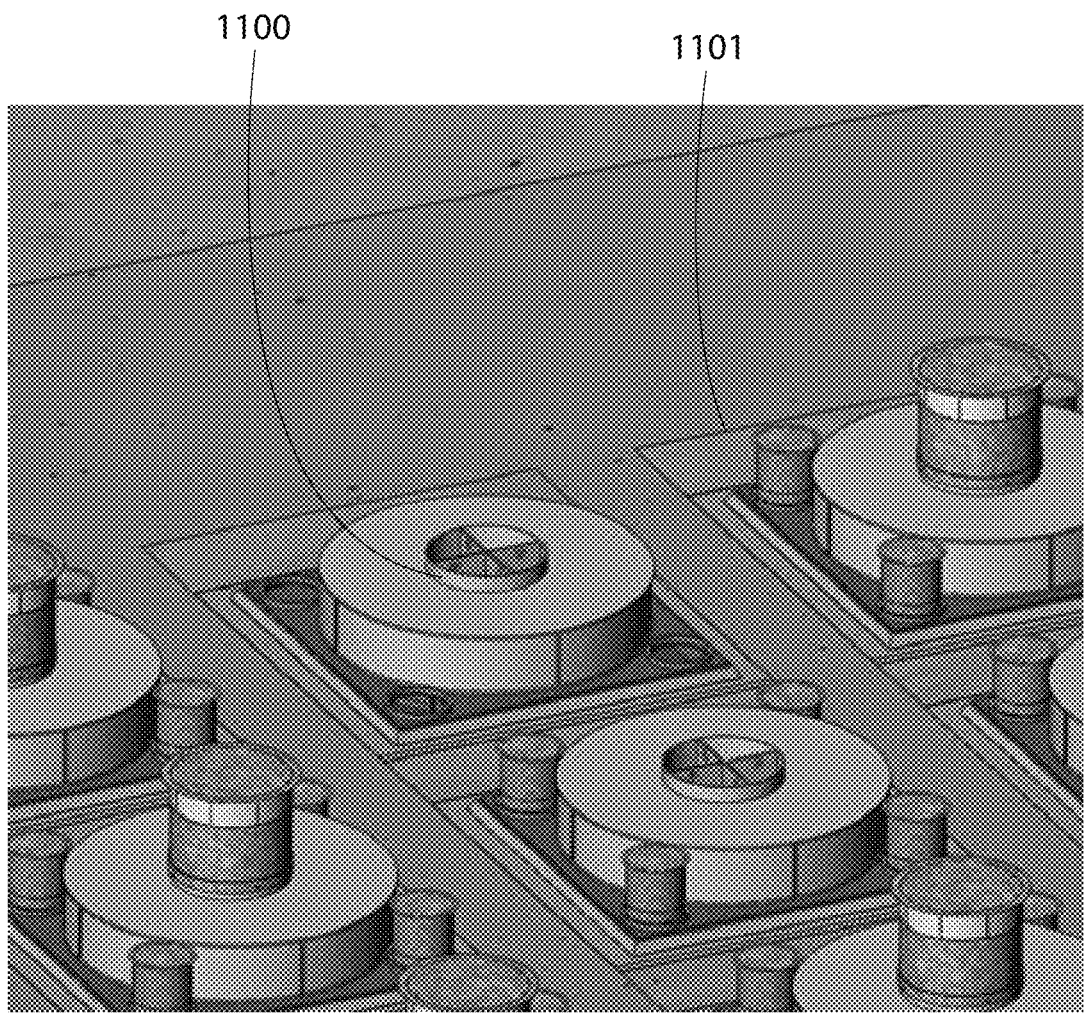
FIG. 25-33 schematically illustrate a method of defueling a nuclear reactor according to an embodiment of the present invention, wherein the nuclear fuel cartridge of FIG. 1 has been used to operate the nuclear reactor.
Figure 26:
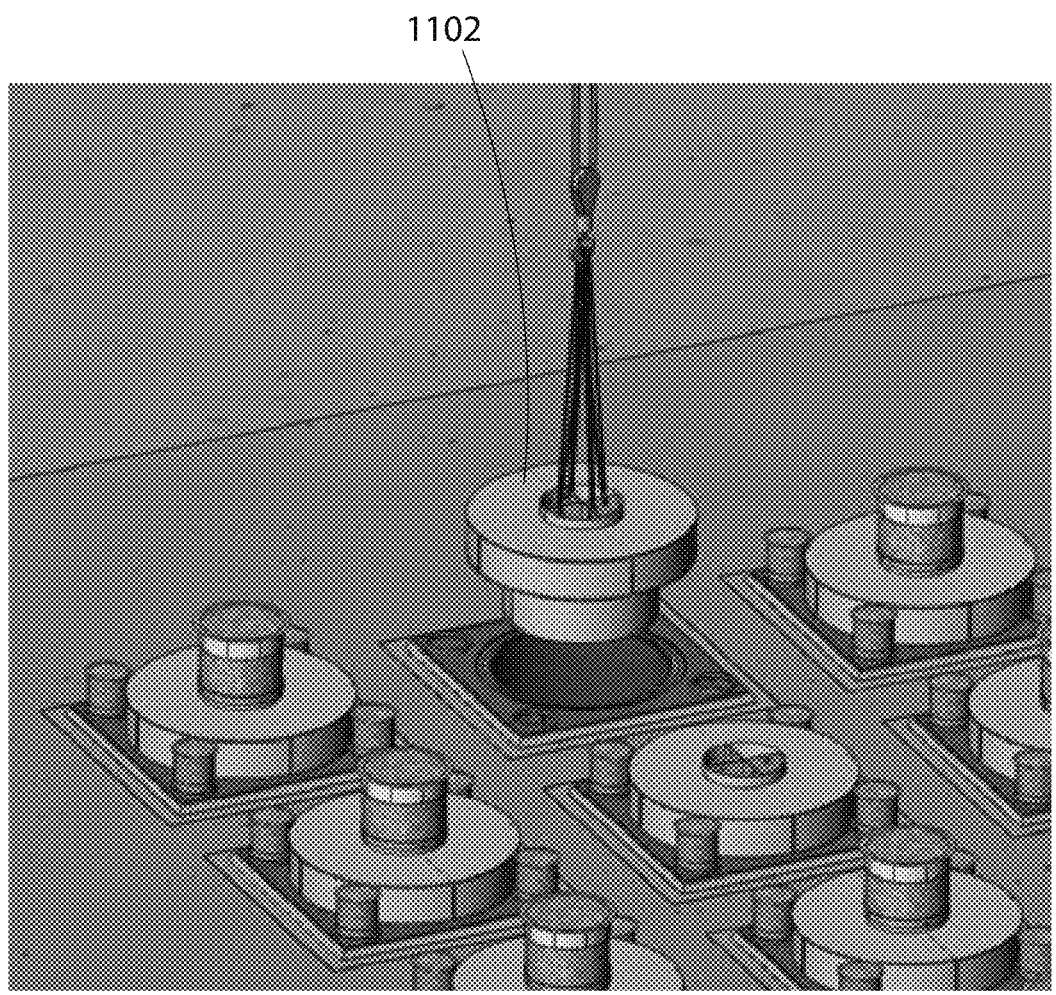

With reference now to FIG. 25, the ventilated storage cask 1100 is prepared for receiving the loaded multi-purpose canister 900. Initially, the flue extensions 1101 of the ventilated storage cask 1100 are removed to access the lid lifting features. With reference to FIG. 26, the lid 1102 of the ventilated storage cask 1100 is then removed.

Figure 27:
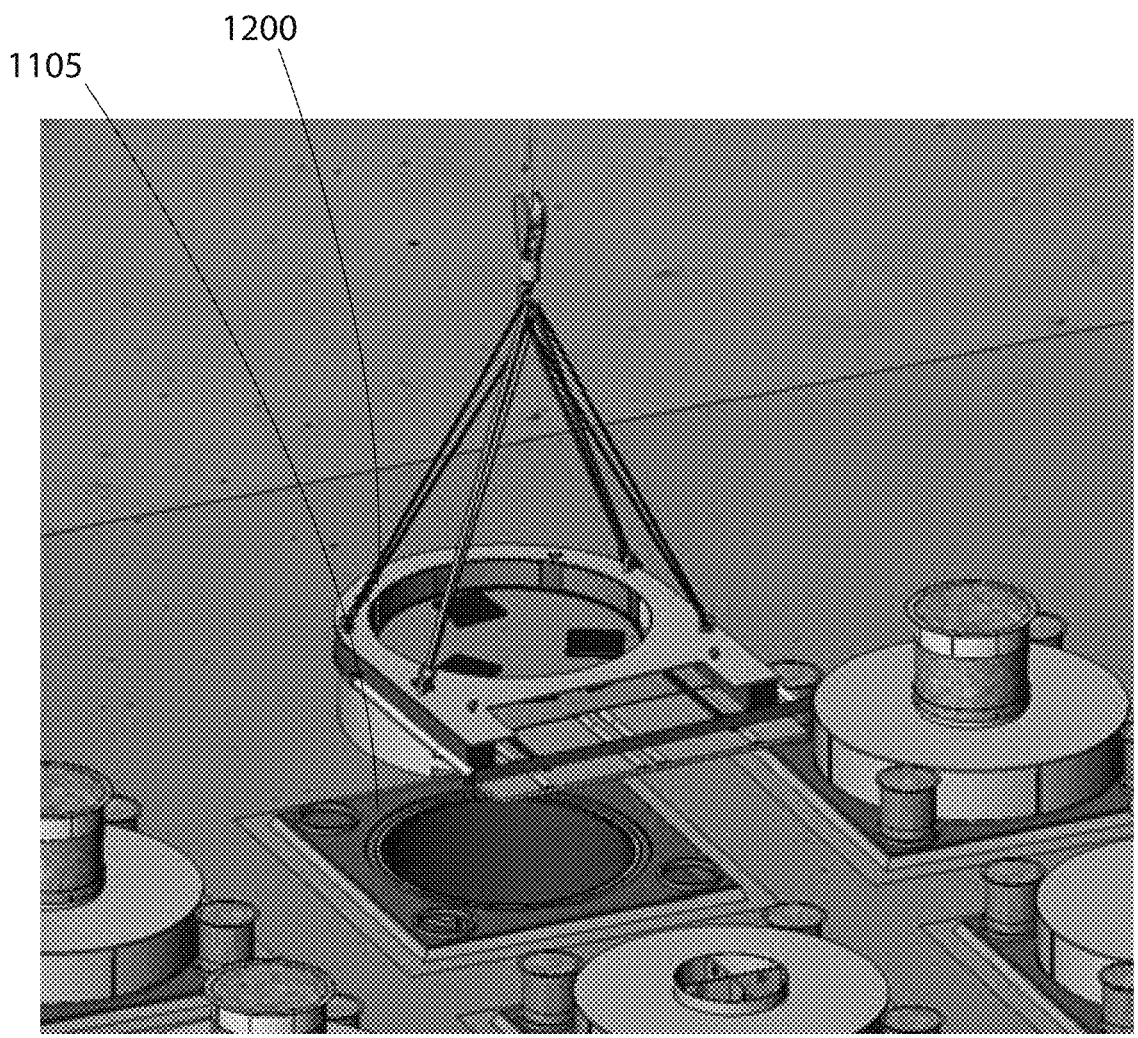
Figure 28:
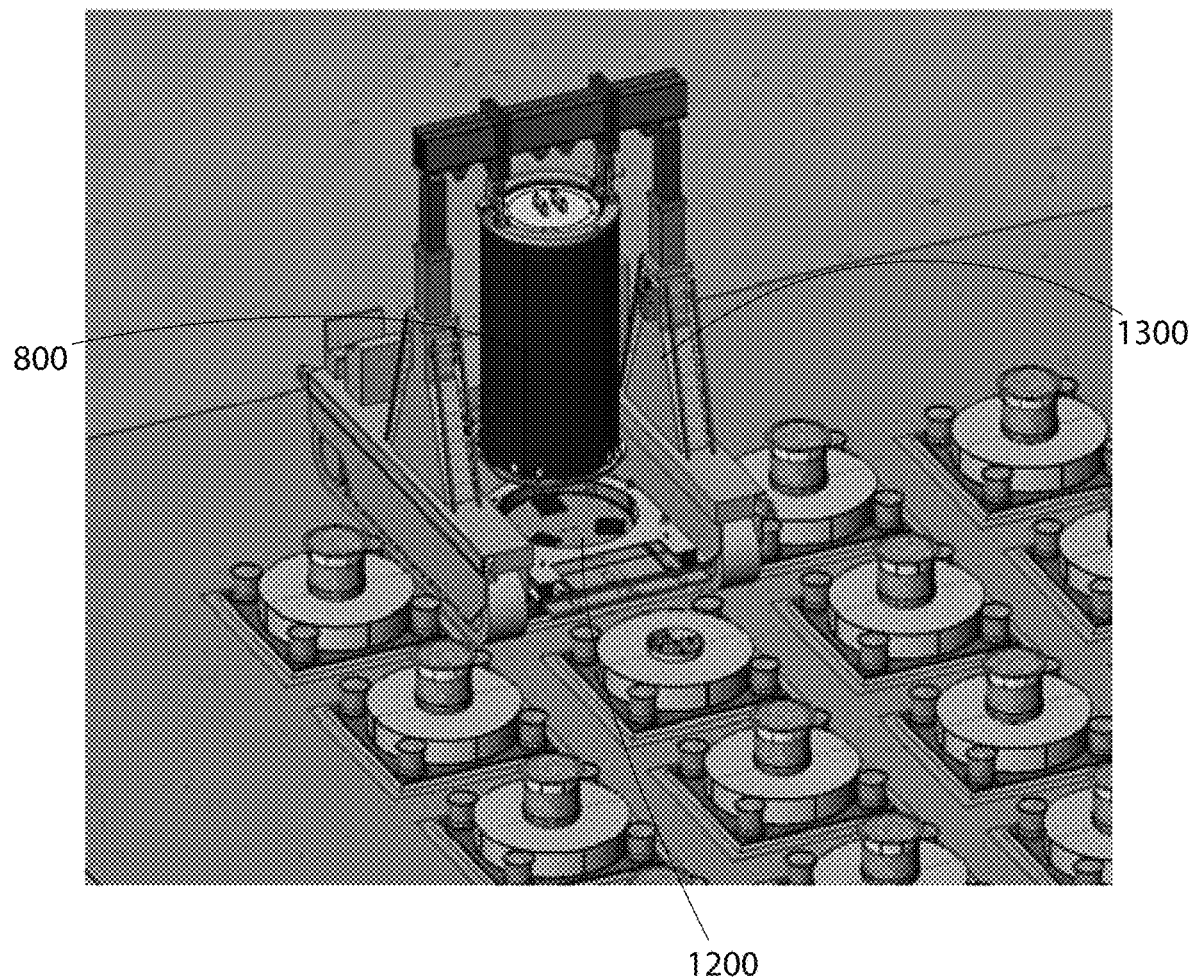
Figure 29:
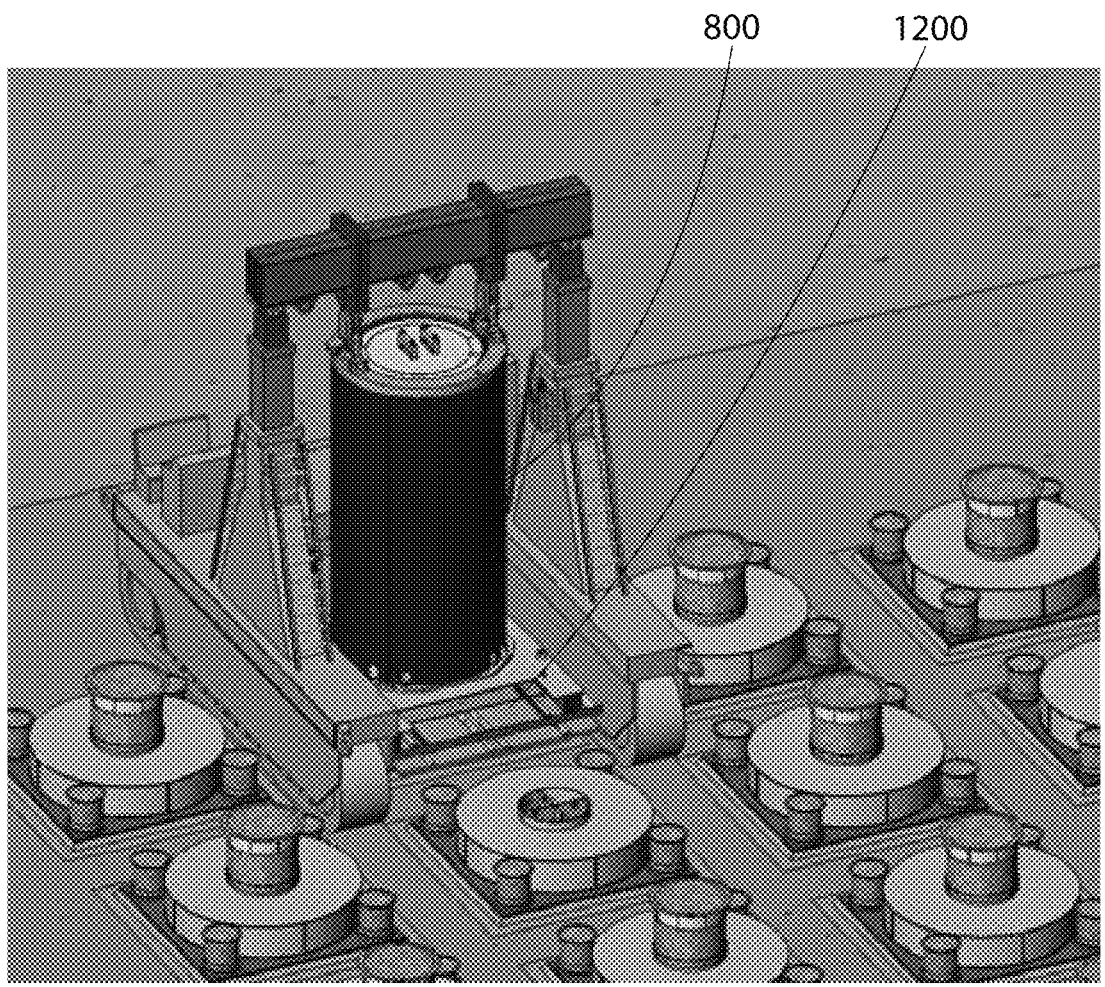

With reference now to FIG. 27, a mating device 1200 is put in position and coupled to the body 1105 of the ventilated storage cask 1100. With reference now to FIG. 28, a cask transporter 1300 then delivers the transfer cask 800 (which is loaded with canister 900, which in turn is loaded with the nuclear fuel cartridge 1000) to position above and in alignment with the mating device 1200. With reference now to FIG. 28, the transfer cask 800 is then mated with the mating device 1200.

Figure 30:
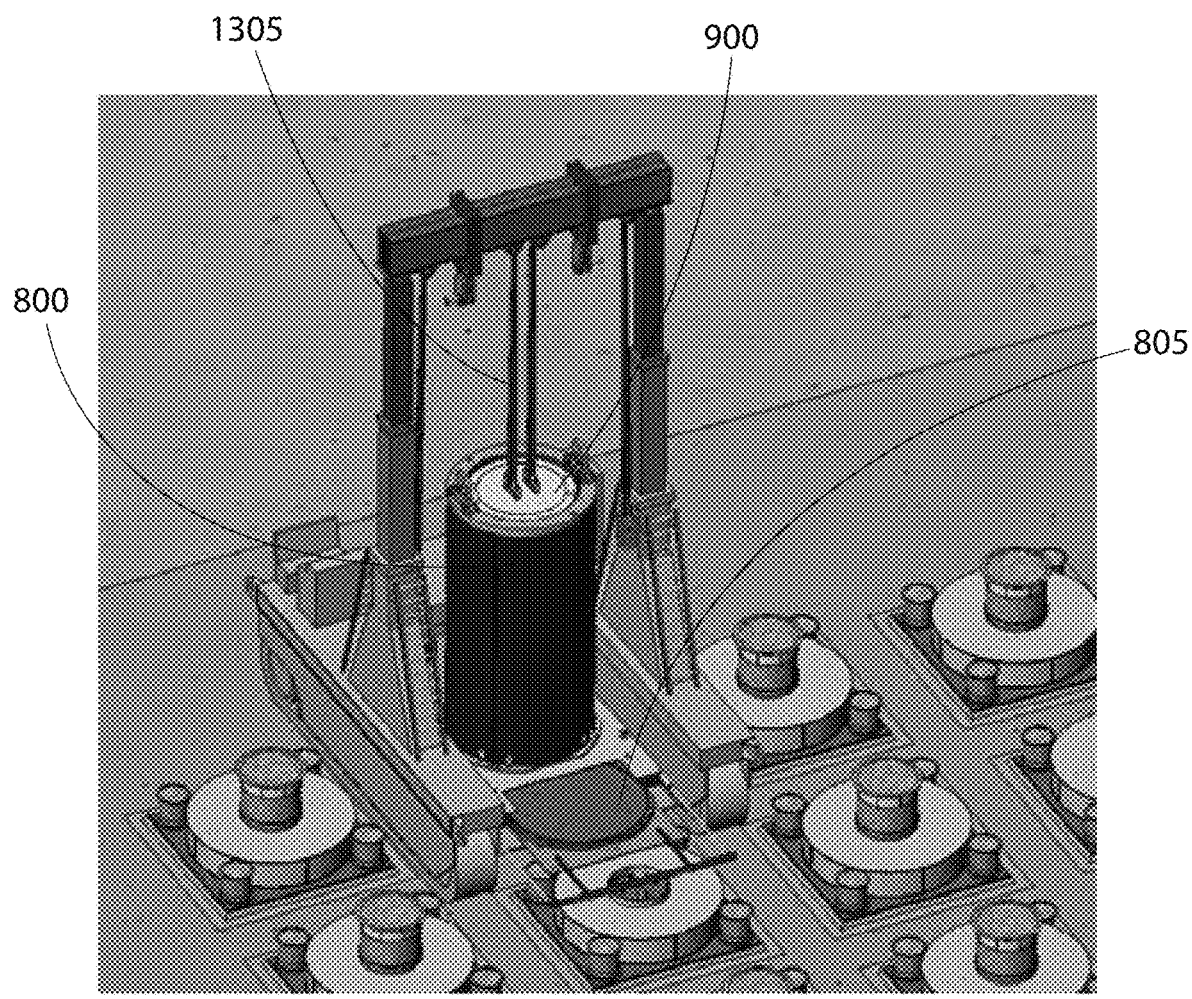
Figure 31:
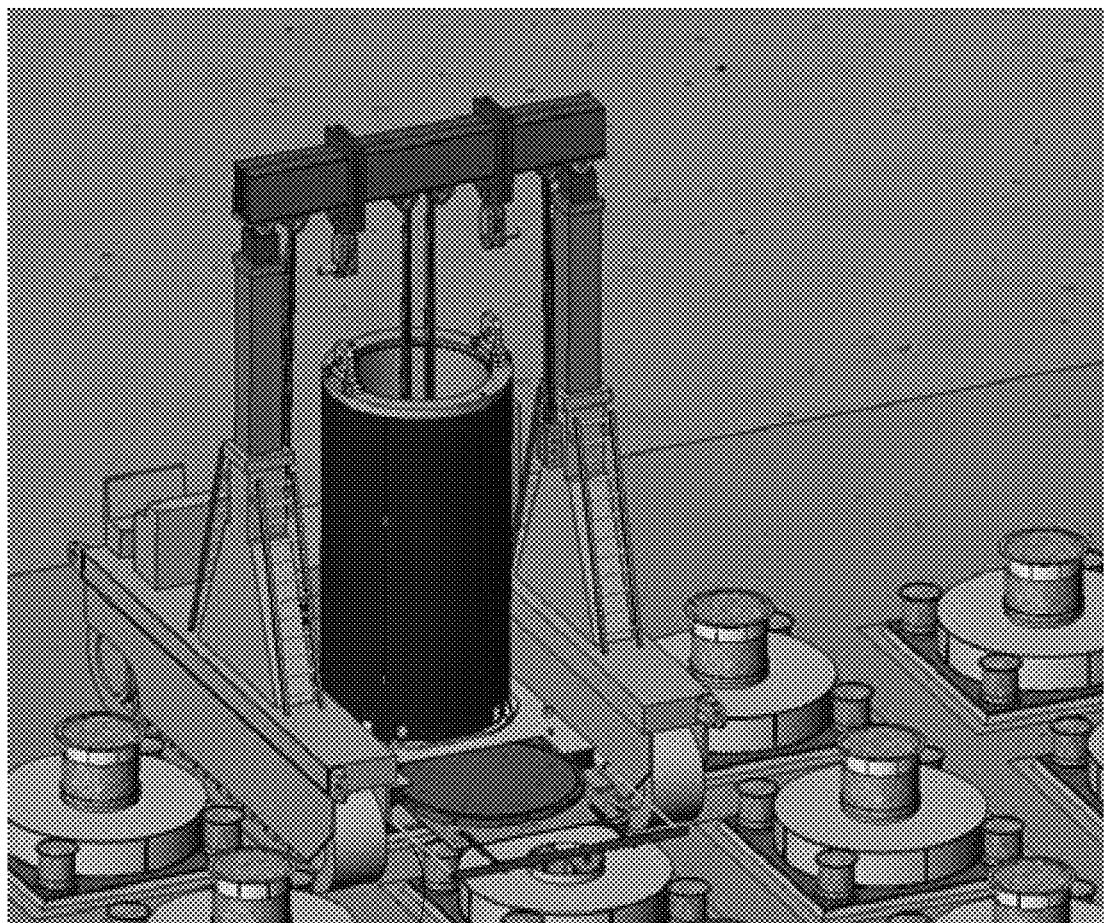
Figure 32:
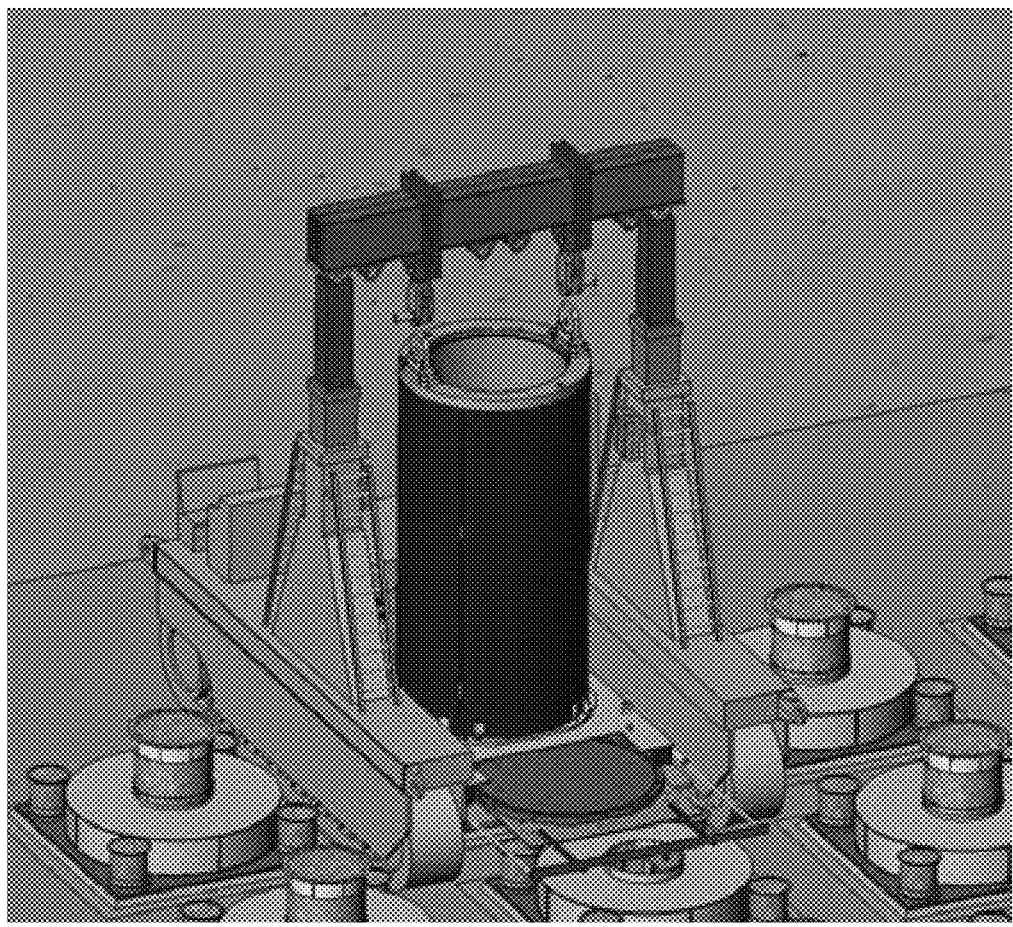
Figure 33:
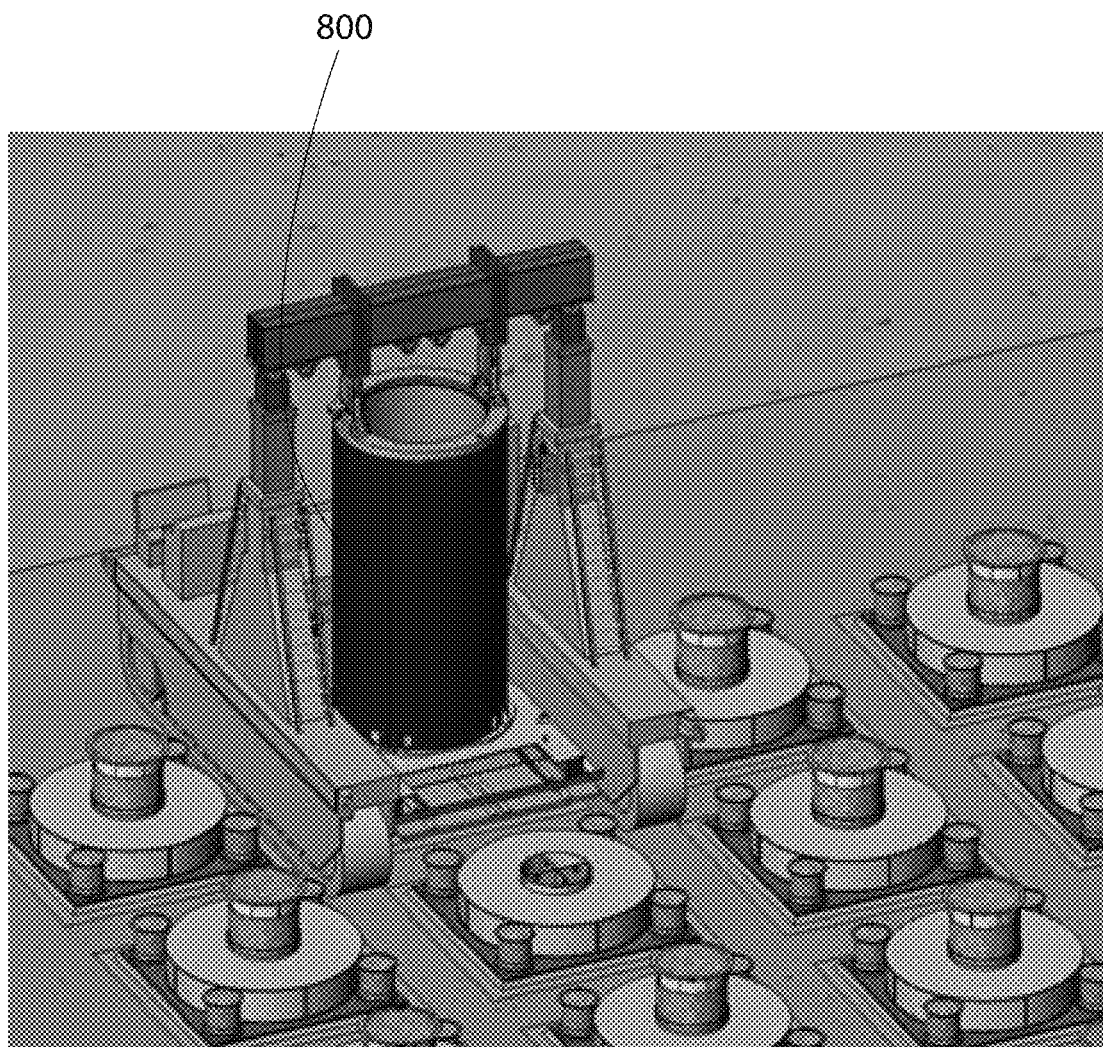

With reference to FIG. 30, the rigging 1305 is attached to the loaded canister 900 and the canister 900 is raised slightly. The bottom lid 805 of the transfer cask 800 is removed and the mating device 1200 is opened. With reference to FIG. 31, the canister is then lowered into the ventilated storage cask 1100. With reference to FIG. 32, the rigging is then disconnected. With reference to FIG. 33, the transfer cask 800 is reconnected to the cask transporter 1300 and the mating device 1200 is closed. The transfer cask 800 and mating device 1200 are then removed and the lid 1102 and vents 1101 of the ventilated storage cask 100 are replaced.

While the foregoing description and drawings represent exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A method of fueling a nuclear reactor, the method comprising:
    a) opening a nuclear reactor vessel;
    b) moving a fully assembled nuclear fuel cartridge from a position outside of the nuclear reactor vessel to a position within an interior cavity of the nuclear reactor vessel, the nuclear fuel cartridge comprising a unitary support structure and a plurality of nuclear fuel assemblies preassembled in the unitary support structure and arranged to collectively form a fuel core, the fuel core mounted in the unitary support structure; and
    c) closing the nuclear reactor vessel;
    wherein the unitary support structure comprises: a bottom core plate, a top core plate, and a plurality of vertically-oriented longitudinal connecting rods interconnecting the top and bottom core plates together;
    wherein the nuclear fuel cartridge comprises a reflector cylinder coupled to the unitary, support structure and circumscribing the nuclear fuel core, the reflector cylinder comprising a plurality of arcuately shaped wall segments coupled together, the longitudinal connecting rods extending in a vertical direction through and inside the wall segments at a peripheral portion of the fuel cartridge;
    wherein the plurality of connecting rods extend axially between and are fixedly coupled to the top and bottom core plates to sandwich the wall segments of the reflector cylinder therebetween.

2. The method according to claim 1, wherein step a) further comprises removing a nuclear reactor vessel head from a nuclear reactor vessel body to provide an opening into the interior cavity of the nuclear reactor vessel; and wherein step b) further comprises lowering the nuclear fuel cartridge into the nuclear reactor vessel body; and wherein step c) further comprises securing the nuclear reactor vessel head to the nuclear reactor vessel body to enclose the opening into the interior cavity.

3. The method according to claim 2, wherein step b) further comprises:
    b-1) coupling a crane to the unitary support structure of the nuclear fuel cartridge;
    b-2) lifting the nuclear fuel cartridge with the crane;
    b-3) lowering the nuclear fuel cartridge into the nuclear reactor vessel body with the crane; and
    b-4) uncoupling the crane from the unitary support structure of the nuclear fuel cartridge.

4. The method according to claim 3, wherein step b-2) further comprises coupling the crane to a lifting ring of the unitary support structure.

5. The method according to claim 1, wherein the fuel core of the nuclear fuel cartridge comprises all nuclear fuel assemblies used to operate the nuclear reactor for a cycle life greater than 24 months.

6. The method according to claim 1, wherein the nuclear fuel cartridge forms a self-supporting assemblage that can be lifted as a single unit during step b).

7. The method according to claim 1, wherein step a) further comprises:
    a-1) setting a water level in a reactor containment enclosure to allow access to head bolts that secure a nuclear reactor vessel head to a nuclear reactor vessel body;
    a-2) removing the head bolts; and
    a-3) raising the water level and removing the nuclear reactor vessel head from the nuclear reactor vessel body to provide an opening into the interior cavity of the nuclear reactor vessel.

8. The method according to claim 1, wherein each of the plurality of nuclear fuel assemblies comprises a plurality of nuclear fuel rods.

9. The method according to claim 1, wherein the fuel core is sandwiched and compressed between the top and bottom core plates.

10. The method according to claim 1, wherein the top and bottom core plates each comprise a lattice structure defining a plurality of open cells, each of the open cells of the top and bottom core plates fluidly communicating with at least one of the plurality of nuclear fuel assemblies to form a fluid flow path therethrough.

11. The method according to claim 10, wherein each of the plurality of fuel assemblies is configured so as to be incapable of being removed from the unitary support structure through its respective open cells of the top and bottom core plates.

12. The method according to claim 11, wherein each of the plurality of fuel assemblies includes a top nozzle and a bottom nozzle formed at opposing ends of the fuel assembly, and wherein each of the top and bottom flow nozzles each include a stepped portion configured and sized to engage the respective top and bottom core plates around one of the open cells in an interlocked arrangement that prevents the fuel assemblies from passing completely through the open cells after the self-supporting assemblage is assembled.

13. The method according to claim 1, wherein the plurality of connecting rods comprises a plurality of peripheral connecting rods located outboard of the nuclear fuel core and a plurality of central connecting rods located inboard of the nuclear fuel core.

* * * * *

UNITED STATES PATENT AND TRADEMARK OFFICE
CERTIFICATE OF CORRECTION

Page 1 of 1

PATENT NO. : 10,923,239 B2
APPLICATION NO. : 15/822704
DATED : February 16, 2021
INVENTOR(S) : Krishna P. Singh et al.

It is certified that error appears in the above-identified patent and that said Letters Patent is hereby corrected as shown below:

On the Title Page

Item (63), Related U.S. Application Data and after the word No., please delete "PCT/US2013/004972" and insert --PCT/US2013/049722--

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*